United States Patent
Takada et al.

(10) Patent No.: US 12,005,530 B2
(45) Date of Patent: Jun. 11, 2024

(54) AC PULSE ARC WELDING CONTROL METHOD

(71) Applicant: DAIHEN CORPORATION, Osaka (JP)

(72) Inventors: Kento Takada, Osaka (JP); Wakana Kondo, Osaka (JP)

(73) Assignee: DAIHEN CORPORATION, Osaka (JP)

(*) Notice: Subject to any disclaimer, the term of this patent is extended or adjusted under 35 U.S.C. 154(b) by 638 days.

(21) Appl. No.: 16/338,887

(22) PCT Filed: Oct. 17, 2017

(86) PCT No.: PCT/JP2017/037552
§ 371 (c)(1),
(2) Date: Apr. 2, 2019

(87) PCT Pub. No.: WO2018/079345
PCT Pub. Date: May 3, 2018

(65) Prior Publication Data
US 2020/0055135 A1   Feb. 20, 2020

(30) Foreign Application Priority Data

Oct. 24, 2016  (JP) ................................. 2016-207958
Nov. 30, 2016  (JP) ................................. 2016-232014
Dec. 28, 2016  (JP) ................................. 2016-254894

(51) Int. Cl.
*B23K 9/09*   (2006.01)
*B23K 9/073*  (2006.01)
*B23K 9/095*  (2006.01)

(52) U.S. Cl.
CPC ............ *B23K 9/092* (2013.01); *B23K 9/0732* (2013.01); *B23K 9/0956* (2013.01)

(58) Field of Classification Search
CPC ........ B23K 9/0732; B23K 9/09; B23K 9/092; B23K 9/093; B23K 9/095; B23K 9/0956;
(Continued)

(56) References Cited

U.S. PATENT DOCUMENTS 6,051,810 A    4/2000  Stava
6,376,802 B1*  4/2002  Tong ...................... B23K 9/08
                                                    219/130.21
(Continued)

FOREIGN PATENT DOCUMENTS

CN      102430840 A  *  5/2012
JP      2002-096168      4/2002
(Continued)

OTHER PUBLICATIONS

Official Communication issued in European Patent Office (EPO) Patent Application No. 17864512.3, dated May 26, 2020.
(Continued)

*Primary Examiner* — Hung D Nguyen
(74) *Attorney, Agent, or Firm* — Greenblum & Bernstein, P.L.C.

(57) ABSTRACT

To stabilize a growth state of a droplet during an electrode negative polarity peak period in consumable electrode AC pulse arc welding. In an AC pulse arc welding control method for controlling welding which is performed by feeding a welding wire, and applying an electrode negative polarity base current during an electrode negative polarity base period, then applying an electrode negative polarity peak current during an electrode negative polarity peak period, and then applying an electrode positive polarity current during an electrode positive polarity period, to repeatedly apply these welding currents, the electrode negative polarity peak period includes a rising period Tu, a peak period Ta, and a falling period Td, a time ratio of the peak (Continued)

period Ta to the electrode negative polarity peak period is less than 20%, and the falling period Td is a period twice or more longer than the rising period Tu.

18 Claims, 14 Drawing Sheets

(58) Field of Classification Search
CPC .......... B23K 9/073; B23K 9/091; B23K 9/10; B23K 9/1006; B23K 9/1012; B23K 9/1043; B23K 9/1075; B23K 9/164; B23K 9/167; B23K 9/173
See application file for complete search history.

(56) References Cited

U.S. PATENT DOCUMENTS

| | | | | |
|---|---|---|---|---|
| 7,842,903 B2 * | 11/2010 | Myers | ................. | B23K 9/1062 |
| | | | | 219/130.21 |
| 11,090,752 B2 * | 8/2021 | Fujiwara | ................. | B23K 9/12 |
| 2002/0030043 A1 * | 3/2002 | Tong | ................. | B23K 9/125 |
| | | | | 219/137 PS |
| 2005/0284854 A1 * | 12/2005 | Tong | ................. | B23K 9/0953 |
| | | | | 219/130.51 |
| 2007/0164007 A1 * | 7/2007 | Peters | ................. | B23K 9/091 |
| | | | | 219/130.51 |
| 2007/0170163 A1 * | 7/2007 | Narayanan | ......... | B23K 35/0266 |
| | | | | 219/130.21 |
| 2007/0246448 A1 * | 10/2007 | Nishisaka | .............. | B23K 9/092 |
| | | | | 219/130.51 |
| 2008/0156781 A1 * | 7/2008 | Artelsmair | ............. | B23K 9/091 |
| | | | | 219/137.71 |
| 2010/0155383 A1 * | 6/2010 | Shiozaki | ................. | B23K 9/09 |
| | | | | 219/130.51 |
| 2012/0097655 A1 * | 4/2012 | Daniel | ................. | B23K 9/0956 |
| | | | | 219/130.21 |
| 2014/0076858 A1 | 3/2014 | Peters | | |
| 2014/0083988 A1 | 3/2014 | Peters | | |
| 2014/0124492 A1 | 5/2014 | Daniel et al. | | |
| 2014/0263237 A1 * | 9/2014 | Daniel | ................. | B23K 9/1043 |
| | | | | 219/130.21 |

FOREIGN PATENT DOCUMENTS

| | | | | |
|---|---|---|---|---|
| JP | | 2011-152575 | | 8/2011 |
| JP | | 2012-096276 | | 5/2012 |
| JP | | 2013136085 A | * | 7/2013 |
| JP | | 2013-240811 | | 12/2013 |
| JP | | 2014-034049 | | 2/2014 |
| JP | | 2014042939 A | * | 3/2014 |
| JP | | 3200614 | | 10/2015 |
| WO | | 2011/114679 | | 9/2011 |

OTHER PUBLICATIONS

Written Opinion of the International Searching Authority dated Jan. 16, 2018 in International Patent Application No. PCT/JP2017/037552.

International Search Report dated Jan. 16, 2018 in International Patent Application No. PCT/JP2017/037552, and corresponding English translation thereof.

* cited by examiner

AC PULSE ARC WELDING CONTROL METHOD

TECHNICAL FIELD

The present invention relates to an AC pulse arc welding control method for controlling welding which is performed by feeding a welding wire, and applying an electrode negative polarity base current during an electrode negative polarity base period, then applying an electrode negative polarity peak current during an electrode negative polarity peak period, and then applying an electrode positive polarity current during an electrode positive polarity period, to repeatedly apply these welding currents.

BACKGROUND ART

In AC pulse arc welding, the welding is performed by repeating the application of a peak current and a base current during an electrode positive polarity period and the application of a base current during an electrode negative polarity period, as one cycle. In the AC pulse arc welding, an electrode negative polarity current ratio, which is a ratio of the current during the electrode negative polarity period to an average value of the welding current, is changed by adjusting the electrode negative polarity period so that the heat input to a base material can be controlled. Thus, low heat input welding can be performed and thus high quality thin sheet welding can be performed. In addition, the bead shape such as a penetration depth and a reinforcement height according to a workpiece can be optimized by changing the electrode negative polarity current ratio. Generally, the electrode negative polarity current ratio is used in a range of about 0% to 30%. Here, the electrode negative polarity current ratio of 0% indicates DC pulse arc welding.

Depending on the workpiece, it may be required to form a bead shape with a small dilution ratio by reducing a penetration portion and enlarging a reinforcement portion. For example, in thick sheet welding for steel materials, it may be required to weld a workpiece having a large gap at a welded joint portion at a high speed. In this case, in order to fill the gap with molten metal and reduce penetration, a bead shape with a small dilution ratio is required. In order to form such a bead shape, it is required to set the electrode negative polarity current ratio to 30% or more, which is a value larger than the above normal range. Sometimes, it is required to set the electrode negative polarity current ratio to a value of more than 50%. In this case, an AC pulse arc welding method is used in which the welding is performed by repeating the application of the peak current and base current during the electrode positive polarity period and the application of the peak current and the base current during the electrode negative polarity period as one cycle. Hereinafter, a technique in the conventional art (see Patent Literature 1) will be described. In the following description, the welding current and the welding voltage in the electrode negative polarity period may be negative values and when describing the magnitudes of the values, the magnitudes of the values mean the absolute values thereof. In addition, the expression of "rising and falling" means that the absolute value of the welding current or the welding voltage increases or decreases.

FIG. 14 is a waveform diagram of a welding current Iw showing an AC pulse arc welding control method in the conventional art. FIG. 14 also shows an electrode positive polarity EP from OA to an upper side, and an electrode negative polarity EN from OA to a lower side. FIG. 14 shows a case where an electrode negative polarity current ratio is set larger than the normal range (about 0% to 30%). In order to prevent arc breakage during polarity switching, a high voltage is applied between a welding wire and a base material for a short time during the polarity switching. Hereinafter, description will be made with reference to FIG. 14.

During an electrode negative polarity base period Tbn from time points t1 to t2, an electrode negative polarity base current Ibn less than a critical value is applied. During an electrode negative polarity peak period Tpn from time points t2 to t3, an electrode negative polarity peak current Ipn having a value larger than the electrode negative polarity base current Ibn is applied. In a time point t3, the polarity is inverted. During an electrode positive polarity peak period Tp from time points t3 to t4, an electrode positive polarity peak current Ip equal to or larger than a critical value is applied. During an electrode positive polarity base period Tb from time points t4 to t5, an electrode positive polarity base current Ib less than a critical value is applied. The period from time points t5 to t6 is the electrode negative polarity base period Tbn again, the period from time points t6 to t7 is the electrode negative polarity peak period Tpn again, and the period from time points t7 to t8 is the electrode positive polarity peak period Tp again. The period from time points t1 to t5 is one pulse cycle Tf. In addition, the period from the time points t1 to t3 is an electrode negative polarity period Ten, and the period from the time points t3 to t5 is an electrode positive polarity period Tep. The electrode negative polarity base current Ibn and the electrode negative polarity peak current Ipn belong to an electrode negative polarity current Ten, and the electrode positive polarity peak current Ip and the electrode positive polarity base current Ib belong to an electrode positive polarity current Iep.

The electrode positive polarity base period Tb may be deleted. In this case, the electrode negative polarity base period Tbn→the electrode negative polarity peak period Tpn→the electrode positive polarity peak period Tp→the electrode negative polarity base period Tbn is repeated.

The electrode positive polarity peak period Tp, the electrode positive polarity peak current Ip, the electrode negative polarity peak period Tpn, the electrode negative polarity peak current Ipn, the electrode negative polarity base current Ibn, and the electrode positive polarity base current Ib are preset to appropriate values. In addition, the length of the pulse cycle Tf is subjected to feedback control (arc length control), such that the average value of the absolute values of the welding voltages is equal to a predetermined voltage setting value. In order to change the pulse cycle Tf, the electrode positive polarity base period Tb or the electrode negative polarity base period Tbn is changed by the feedback control. When the electrode positive polarity base period Tb is changed by the feedback control, the electrode negative polarity base period Tbn is preset to an appropriate value. Conversely, when the electrode negative polarity base period Tbn is changed by the feedback control, the electrode positive polarity base period Tb is preset to an appropriate value. In FIG. 14, an electrode negative polarity current ratio Ren is as follows.

$$Ren(\%)=((Tpn \cdot |Ipn|+Tbn|Ibn|)/(Tp \cdot Ip+Tpn \cdot |Ipn|+Tbn \cdot |Ibn|+Tb \cdot Ib)) \times 100$$

In a case where the material of the welding wire is iron and the type of the shielding gas is a mixed gas of 80 vol % Ar+20 vol % $CO_2$, the setting value of each parameter is, for example, as follows. Tp=1.7 ms, Ip=500 A, Tpn=2.5 ms, Ipn=300 A, Ib=50 A, and Ibn=70 A. In a case where the Tbn is subjected to the feedback control, Tb=0 to 4.0 ms. When Tb=0, there is no electrode positive polarity base period. The range of the Tbn being subjected to the feedback control is about 1 ms to 10 ms.

Next, formation and transferring of droplets will be described with reference to FIG. 14. The droplets transfer when the electrode positive polarity peak period Tp comes to an end, i.e., at the time point t4. Since during the electrode positive polarity base period Tb from the time points t4 to t5, a small current less than the critical value is applied, and the polarity is the electrode positive polarity EP, a tip of the welding wire hardly melts, and almost no droplet is formed.

During the electrode negative polarity base period Tbn from the time points t5 to t6, the tip of the welding wire is melted, and small droplets are formed. Since during the electrode negative polarity peak period Tpn from the time points t6 to t7, the electrode negative polarity peak current Ipn having a large current value is applied, the droplets grow rapidly and become large. In the latter half of this period, constrictions are gradually formed in the droplets, but usually no droplets transfer due to the large droplet size. Since during the electrode positive polarity peak period Tp from the time points t7 to t8, a large current equal to or larger than the critical value is applied, a strong electromagnetic pinching force acts on the constrictions of the droplets, the constrictions proceed rapidly and the droplets transfer to a molten pool.

Background Art Literature

Patent Literature

Patent Literature 1: JP-A-2014-34049

SUMMARY OF INVENTION

Problem to be Solved by the Invention

As described above, in the AC pulse arc welding in the conventional art, the droplets of the tip of the welding wire gradually become large during the electrode negative polarity base period Tbn, and grows rapidly and become large when entering the electrode negative polarity peak period Tpn.

Since the electrode negative polarity peak current Ipn having a larger current value is continuously applied during the electrode negative polarity peak period Tpn, an arc pressure and a strong repulsive force due to metal vapor ejected from the molten pool act on the droplets. Thus, the growth of the droplets is unstable, and the size of the formed droplets varies. As a result, there was a problem that the droplet transfer is unstable during the electrode positive polarity peak period Tp.

Accordingly, an object of the present invention is to provide an AC pulse arc welding control method capable of stabilizing the growth of droplets during an electrode negative polarity peak period.

Means for Solving the Problem

In order to attain the above-mentioned object, the present disclosure relates to
an AC pulse arc welding control method for controlling welding which is performed by feeding a welding wire, and applying an electrode negative polarity base current during an electrode negative polarity base period, then applying an electrode negative polarity peak current during an electrode negative polarity peak period, and then applying an electrode positive polarity current during an electrode positive polarity period, to repeatedly apply these welding currents, wherein
the electrode negative polarity peak period includes a rising period, a peak period, and a falling period, and
a time ratio of the peak period to the electrode negative polarity peak period is less than 20%.

In the AC pulse arc welding control method according to the present disclosure, the falling period is a period twice or more longer than the rising period.

In the AC pulse arc welding control method according to the present disclosure, the welding current continuously decreases during the falling period.

In the AC pulse arc welding control method according to the present disclosure, an absolute value of the welding current during the falling period is a constant value smaller than that during the peak period.

In the AC pulse arc welding control method according to the present disclosure, the welding current decreases so that an absolute value of a change ratio of the welding current continuously increases during the falling period.

In the AC pulse arc welding control method according to the present disclosure,
the electrode positive polarity period includes an electrode positive polarity peak period during which an electrode positive polarity peak current is applied,
the electrode positive polarity peak period includes an electrode positive polarity rising period, an electrode positive polarity maximum value period, and an electrode positive polarity falling period, and
a time ratio of the electrode positive polarity maximum value period to the electrode positive polarity peak period is less than 20%.

In the AC pulse arc welding control method according to the present disclosure,
the welding current increases so that an absolute value of a change ratio of the welding current continuously decreases during the electrode positive polarity rising period, and
the welding current decreases so that an absolute value of a change ratio of the welding current continuously decreases during the electrode positive polarity falling period.

In the AC pulse arc welding control method according to the present disclosure,
the electrode positive polarity period includes an electrode positive polarity peak period during which an electrode positive polarity peak current is applied,
the electrode positive polarity peak period includes an electrode positive polarity rising period, an electrode positive polarity maximum value period, and an electrode positive polarity falling period, and
the electrode positive polarity maximum value period includes a first maximum value period during which a first maximum current is applied and a second maximum value period during which a second maximum current is applied, and the first maximum current is larger than the second maximum current.

In the AC pulse arc welding control method according to the present disclosure, when a short circuit occurs during the electrode negative polarity base period, a feed speed of the welding wire is reduced until the electrode negative polarity base period ends.

In the AC pulse arc welding control method according to the present disclosure, when a short circuit occurs during the electrode negative polarity base period, the electrode negative polarity base period is shifted to the electrode negative polarity peak period.

Effects of Invention

According to the present invention, the growth of droplets can be stabilized during an electrode negative polarity peak period in AC pulse arc welding.

EMBODIMENTS FOR CARRYING OUT THE INVENTION

Hereinafter, embodiments of the present invention will be described with reference to the drawings.

First Embodiment

Figure 14:
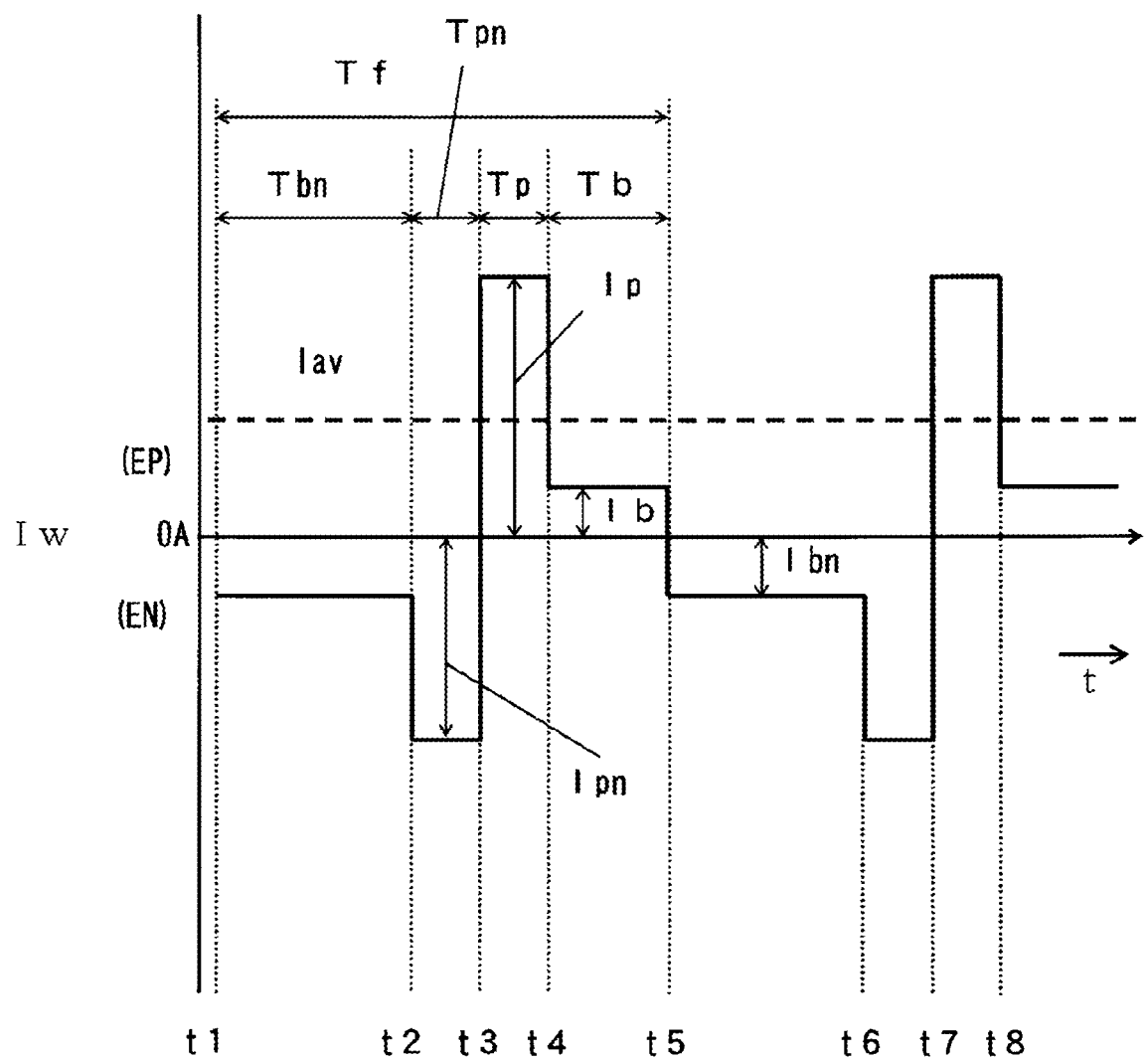
FIG. 14 is a current waveform diagram of AC pulse arc welding in the conventional art.

A welding current waveform in an AC pulse arc welding control method according to a first embodiment of the present invention is same as that in FIG. 14 except for the waveform of the electrode negative polarity peak current Ipn. That is, there are a case of taking an electrode negative polarity base period Tbn→an electrode negative polarity peak period Tpn→an electrode positive polarity peak period Tp→an electrode positive polarity base period Tb as one pulse cycle Tf, and a case of taking the electrode negative polarity base period Tbn→the electrode negative polarity peak period Tpn→the electrode positive polarity peak period Tp as one pulse cycle Tf. Hereinafter, the waveform of the electrode negative polarity peak current Ipn will be described.

Figure 1:
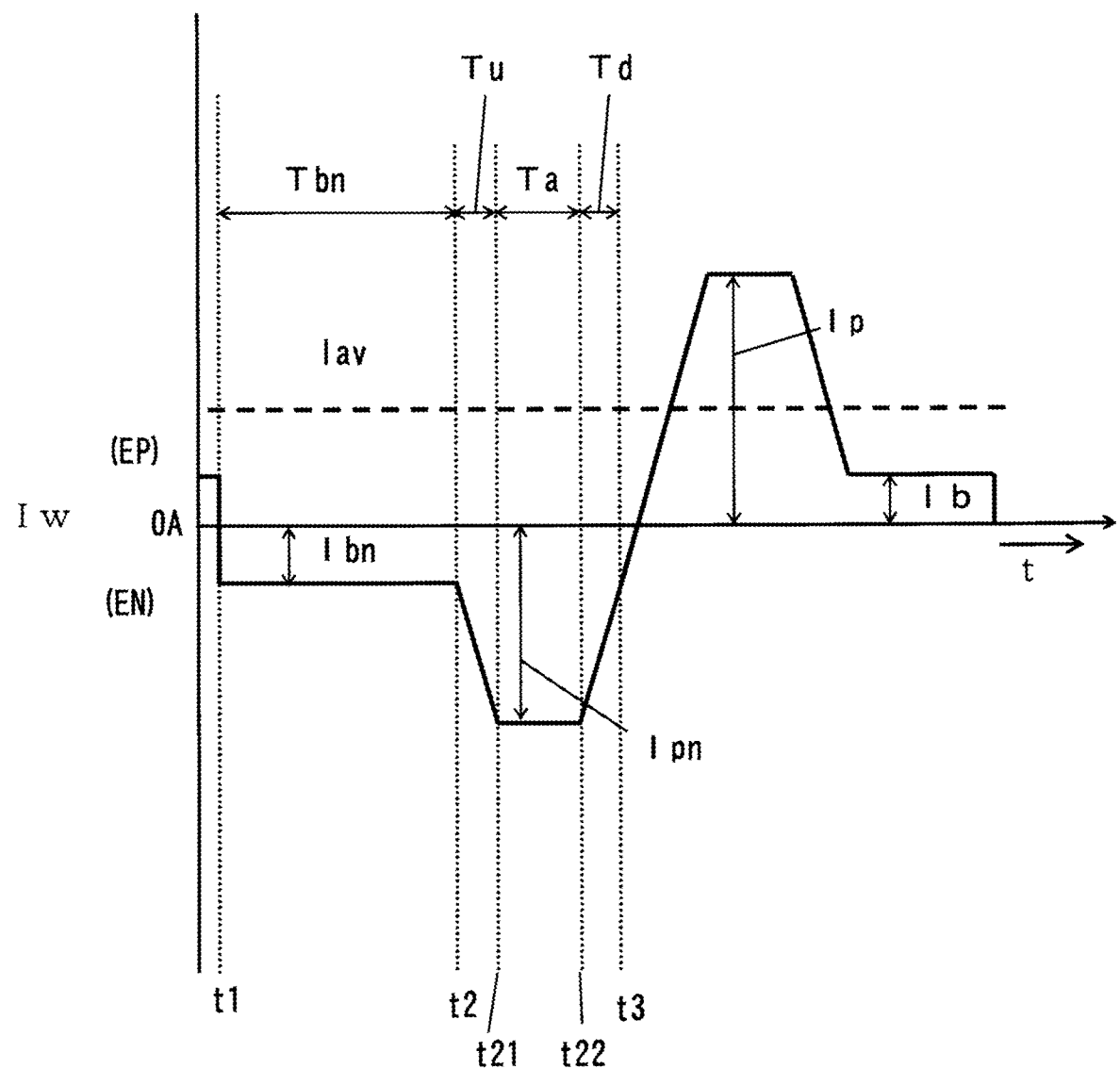
FIG. 1 is a first welding current waveform diagram showing a waveform of an electrode negative polarity peak current Ipn in an AC pulse arc welding control method according to a first embodiment of the present invention.

FIG. 1 is a first welding current waveform diagram showing the waveform of the electrode negative polarity peak current Ipn in the AC pulse arc welding control method according to the first embodiment of the present invention. Welding current waveforms of other periods are the same as FIG. 14. In FIG. 1, a period before a time point t2 is the electrode negative polarity base period Tbn, and a period before a time point t3 is the electrode positive polarity peak period Tp whose polarity is inverted. Hereinafter, description will be made with reference to FIG. 1.

In the time point t2, the electrode negative polarity base period Tbn is switched to the electrode negative polarity peak period Tpn, and the electrode negative polarity peak current Ipn starts to be applied.

The electrode negative polarity peak period Tpn includes a rising period Tu from time points t2 to t21, a peak period Ta from time points t21 to t22, and a falling period Td from time points t22 to t3.

During the rising period Tu from the time points t2 to t21, the current linearly increases from the electrode negative polarity base current Ibn to a peak value. During the peak period Ta from the time points t21 to t22, the peak value is maintained. During the falling period Td from the time points t22 to t3, the current linearly decreases from the peak value to a predetermined polarity switching current value (about 50 A). In the time point t3, the polarity of the electrode negative polarity peak current Ipn is switched from an electrode negative polarity EN to an electrode positive polarity EP in a state of the polarity switching current value. At this time, in order to prevent arc breakage, a high voltage of several hundred volts is applied between a welding wire and a base material.

The above peak value is set to substantially the same value as the peak value of the electrode negative polarity peak current Ipn in the case of the conventional art shown in FIG. 14. In addition, an integrated value of the electrode negative polarity peak current Ipn during the electrode negative polarity peak period Tpn is set to substantially the same value as an integrated value in the case of a rectangular wave in the conventional art shown in FIG. 14.

In the first embodiment, a time ratio of the peak period Ta to the electrode negative polarity peak period Tpn is set to be less than 20%. That is, Ta is set to satisfy (Ta/Tpn)×100<20. Accordingly, an arc pressure and a repulsive force due to metal vapor ejected from a molten pool, which act on droplets, can be alleviated. As a result, the growth of the droplets can be stabilized during the electrode negative polarity peak period Tpn and droplets of a desired size can always be formed. When the time ratio during the peak period Ta is more than 20%, the repulsive force is strong, and the growth of the droplets is unstable. It is further desired that the time ratio during the peak period Ta is less than 10%. In this way, the repulsive force is further weakened and the growth of the droplets is further stabilized.

Since the integrated value of the electrode negative polarity peak current Ipn is substantially the same value as that in the case of the rectangular wave in the conventional art, the size of the formed droplets is equal.

It is desired that the falling period Td is set to a period twice or more longer than the rising period Tu in the first embodiment. In this way, a falling speed of the heat input to the droplets is slow and the growth of the droplets is more stabilized. It is further desired that the falling period Td is set to a period three times or more longer than the rising period Tu in the first embodiment. In this way, the falling speed of the heat input to the droplets is slower and the growth of the droplets is further stabilized.

Figure 2:
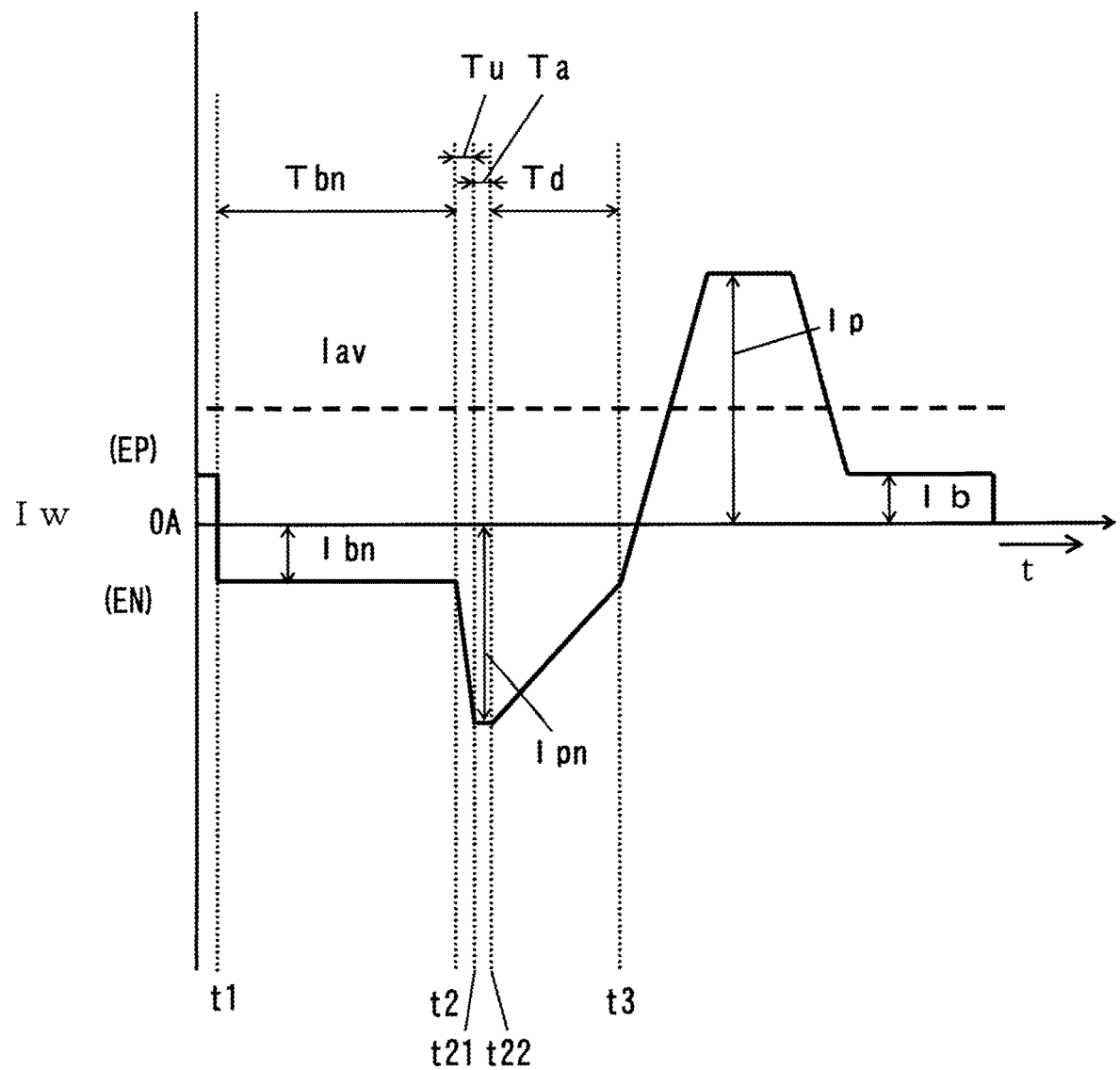
FIG. 2 is a second welding current waveform diagram showing a waveform of the electrode negative polarity peak current Ipn in the AC pulse arc welding control method according to the first embodiment of the present invention.

FIG. 2 is a second welding current waveform diagram showing a waveform of the electrode negative polarity peak current Ipn in the AC pulse arc welding control method according to the first embodiment of the present invention.

In FIG. 2, the rising period Tu and the peak period Ta are set to be shorter. Thus, FIG. 2 shows almost a sawtooth wave. Even when such a waveform is set, the same effect as in FIG. 1 can be obtained.

Figure 3:
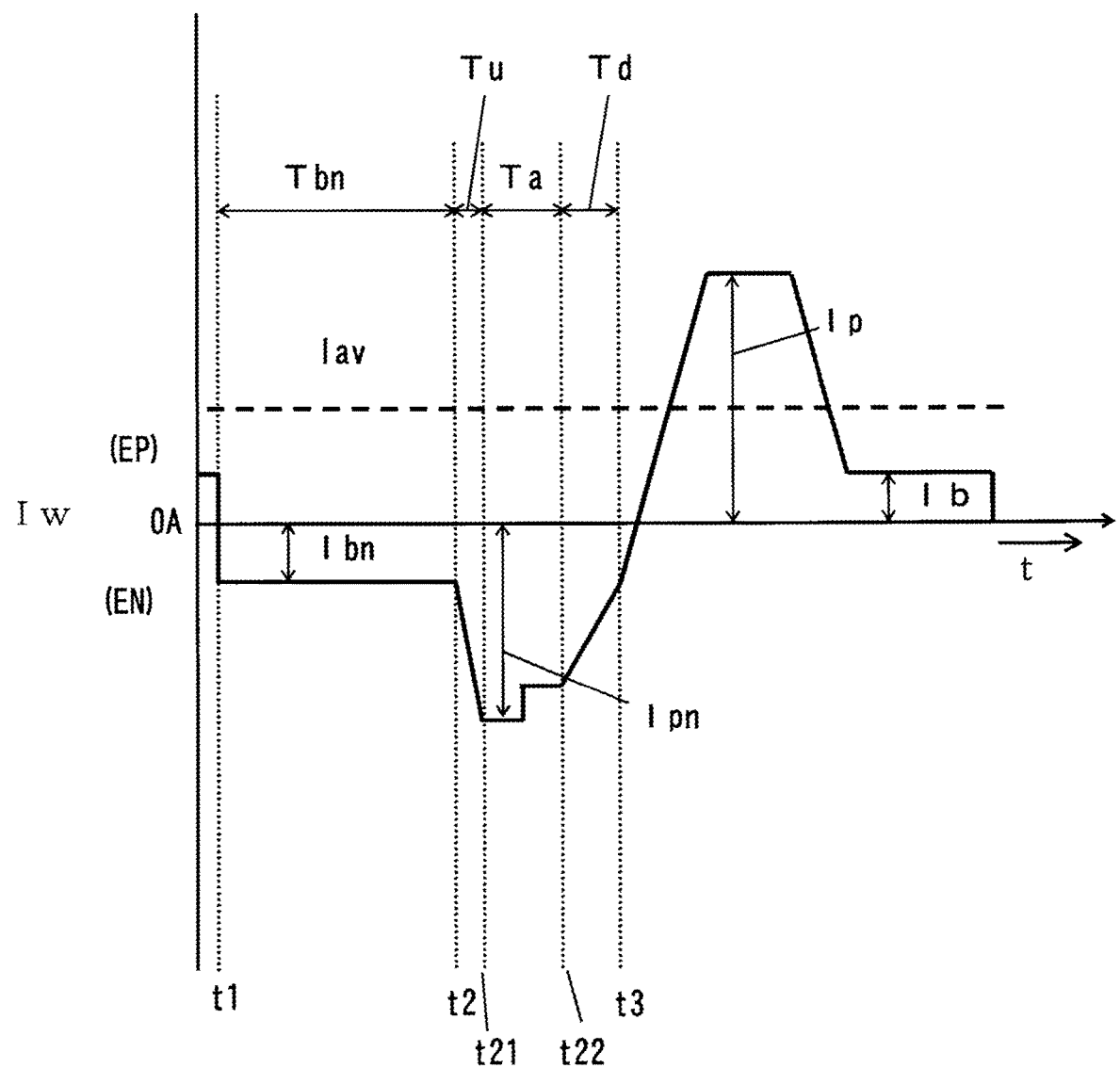
FIG. 3 is a third welding current waveform diagram showing a waveform of the electrode negative polarity peak current Ipn in the AC pulse arc welding control method according to the first embodiment of the present invention.

FIG. 3 is a third welding current waveform diagram showing a waveform of the electrode negative polarity peak current Ipn in the AC pulse arc welding control method according to the first embodiment of the present invention.

In FIG. 3, the rising period Tu is set to be shorter. In addition, the current during the falling period Td is a constant value smaller than the peak value. Thus, FIG. 3 shows almost a stepwise waveform of two stages. Even when such a waveform is set, the same effect as in FIG. 1 can be obtained.

Figure 4:
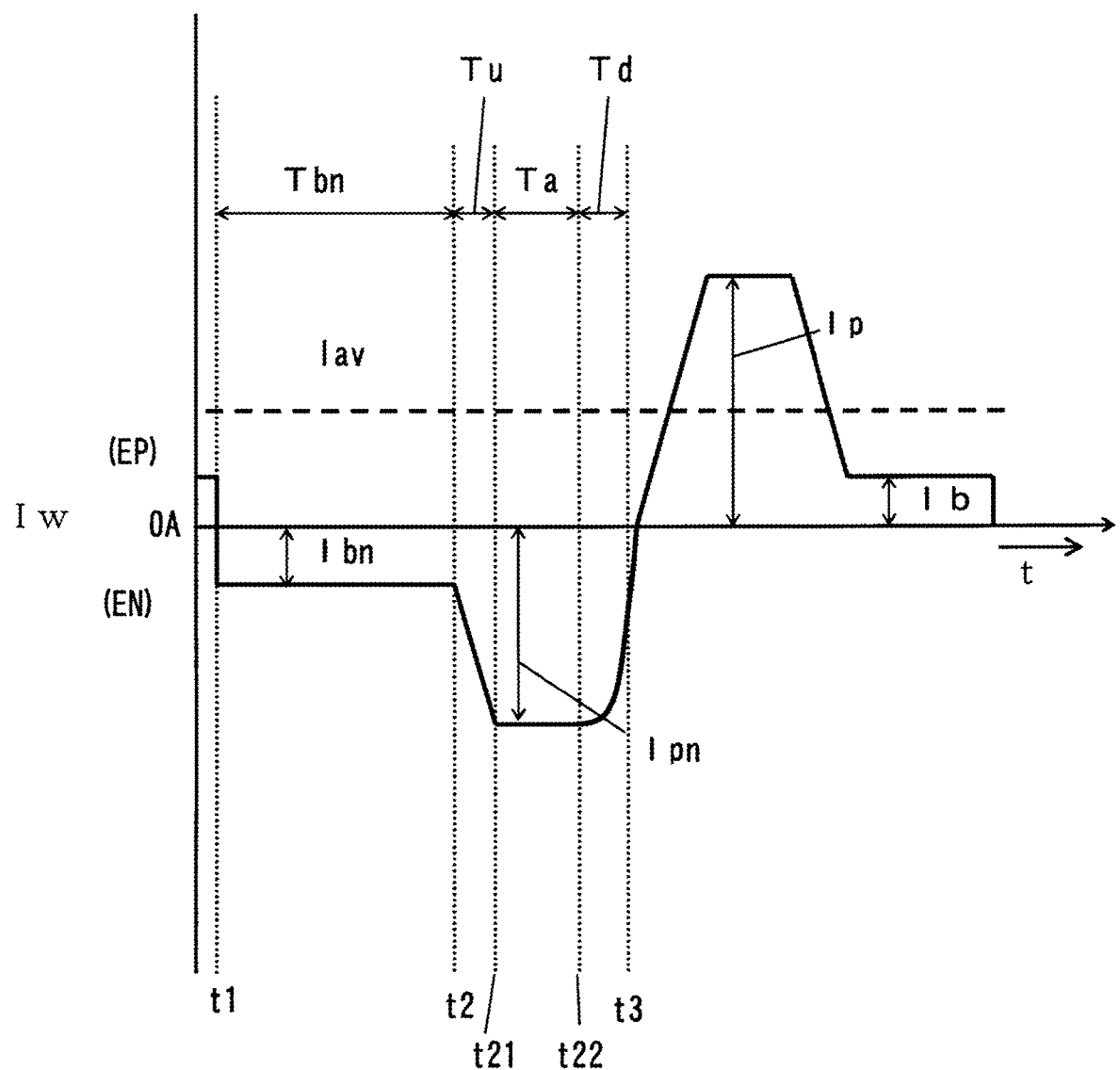
FIG. 4 is a fourth welding current waveform diagram showing a waveform of the electrode negative polarity peak current Ipn in the AC pulse arc welding control method according to the first embodiment of the present invention.

FIG. 4 is a fourth welding current waveform diagram showing a waveform of the electrode negative polarity peak current Ipn in the AC pulse arc welding control method according to the first embodiment of the present invention.

FIG. 4 shows a rising period Tu and a peak period Ta same as those in FIG. 1. The current during the falling period Td decreases not linearly but curvedly. The "curvedly" indicates a state where the welding current decreases so that an absolute value of a change ratio of the welding current continuously increases. When such a waveform is set, the growth of the droplets is more stabilized than in the case of FIG. 1 since the change ratio when the absolute value of the current value is large is small.

Figure 5:
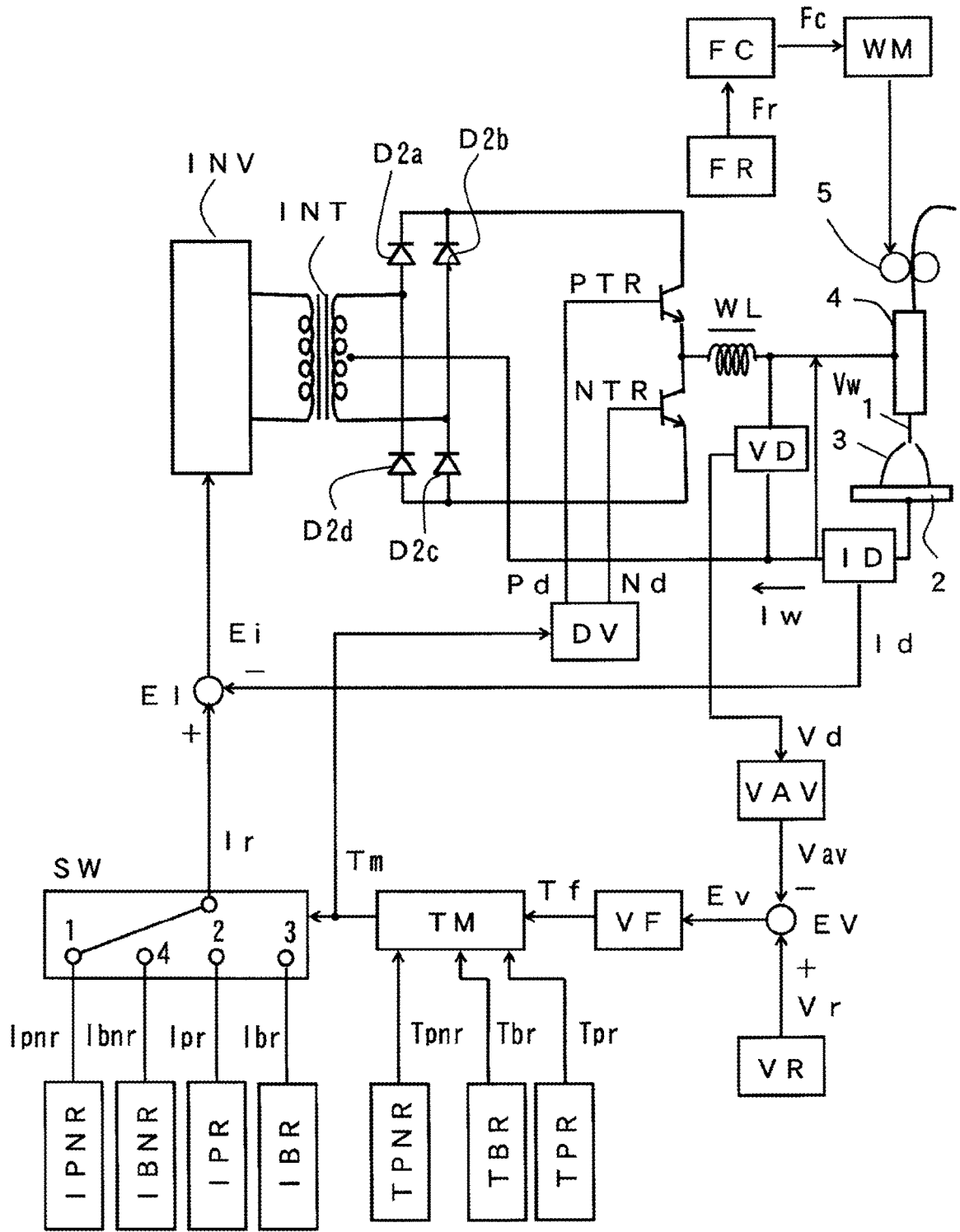
FIG. 5 is a block diagram of a welding power source for performing the AC pulse arc welding control method according to the first embodiment of the present invention.

FIG. 5 is a block diagram of a welding power source for performing the AC pulse arc welding control method according to the first embodiment of the present invention described above with reference to FIGS. 1 to 4. FIG. 5 shows a case where the electrode negative polarity base period Tbn is changed by feedback control and the electrode positive polarity base period Tb is a predetermined value. In FIG. 5, a high voltage application circuit during the above polarity switching is omitted. Hereinafter, each block will be described below with reference to FIG. 5.

An inverter circuit INV receives an input from a 3-phase 200 V AC commercial power source (not shown) or the like, performs inverter control on a rectified and smoothed DC voltage by pulse width modulation control based on a current error amplification signal Ei to be described later, and outputs a high frequency AC voltage. An inverter transformer INT steps down the high frequency AC voltage to a voltage value suitable for arc welding. Secondary rectifiers D2a to D2d rectify the step-down high frequency AC voltage to a DC voltage.

An electrode positive polarity transistor PTR is turned on by an electrode positive polarity drive signal Pd to be described later, and in this case, the output of the welding power source is the electrode positive polarity EP. An electrode negative polarity transistor NTR is turned on by an electrode negative polarity drive signal Nd to be described later, and in this case, the output of the welding power source is the electrode negative polarity EN.

A reactor WL smoothes the output with ripples.

A welding wire 1 is fed inside a welding torch 4 by the rotation of a feed roll 5 coupled to a wire feed motor WM, and an arc 3 is generated between the welding wire 1 and a base material 2. A welding voltage Vw is applied between the welding wire 1 and the base material 2, and a welding current 1w is supplied.

A voltage detection circuit VD detects the welding voltage Vw and outputs a voltage detection signal Vd. A voltage averaging circuit VAV averages absolute values of the voltage detection signal Vd and outputs a voltage average value signal Vav. A voltage setting circuit VR outputs a predetermined voltage setting signal Vr. A voltage error amplification circuit EV amplifies an error between the voltage setting signal Vr and the voltage average value signal Vav and outputs a voltage error amplification signal Ev.

A voltage and frequency conversion circuit VF converts the voltage error amplification signal Ev into a signal having a frequency proportional to the voltage error amplification signal Ev, and outputs a pulse cycle signal Tf which is at a high level only for a short time for each frequency. The pulse cycle signal Tf is a trigger signal which is at a high level for a short time for each pulse cycle.

An electrode negative polarity peak period setting circuit TPNR outputs a predetermined electrode negative polarity peak period setting signal Tpnr.

An electrode positive polarity peak period setting circuit TPR outputs a predetermined electrode positive polarity peak period setting signal Tpr. An electrode positive polarity base period setting circuit TBR outputs a predetermined electrode positive polarity base period setting signal Tbr.

A timer circuit TM receives the pulse cycle signal Tf, the electrode negative polarity peak period setting signal Tpnr, the electrode positive polarity peak period setting signal Tpr and the electrode positive polarity base period setting signal Tbr as inputs and then outputs a timer signal Tm. Every time the pulse cycle signal Tf changes to a high level for a short time, the value of the timer signal becomes 1 during a period determined by the electrode negative polarity peak period setting signal Tpnr. Then, the value of the timer signal becomes 2 during a period determined by the electrode positive polarity peak period setting signal Tpr. Then, the value of the timer signal becomes 3 during a period determined by the electrode positive polarity base period setting signal Tbr. Thereafter, the value of the timer signal becomes 4 during the electrode negative polarity base period.

An electrode negative polarity peak current setting circuit IPNR stores the waveforms shown in FIGS. 1 to 4, and outputs an electrode negative polarity peak current setting signal Ipnr by selecting one of the waveforms.

An electrode positive polarity peak current setting circuit IPR outputs a predetermined electrode positive polarity peak current setting signal Ipr. An electrode positive polarity base current setting circuit IBR outputs a predetermined electrode positive polarity base current setting signal Ibr.

An electrode negative polarity base current setting circuit IBNR outputs a predetermined electrode negative polarity base current setting signal Ibnr.

A switching circuit SW receives the timer signal Tm, the electrode negative polarity peak current setting signal Ipnr, the electrode positive polarity peak current setting signal Ipr, the electrode positive polarity base current setting signal Ibr and the electrode negative polarity base current setting signal Ibnr as inputs, and outputs the electrode negative polarity peak current setting signal Ipnr as a current setting signal Ir when the timer signal Tm=1, outputs the electrode positive polarity peak current setting signal Ipr as the current setting signal Ir when the timer signal Tm=2, outputs the electrode positive polarity base current setting signal Ibr as the current setting signal Ir when the timer signal Tm=3, and outputs the electrode negative polarity base current setting signal Ibnr as the current setting signal Ir when the timer signal Tm=4.

A current detection circuit ID detects the absolute value of the welding current Iw and outputs a current detection signal Id. A current error amplification circuit EI amplifies an error between the current setting signal Ir and the current detection signal Id and outputs a current error amplification signal Ei.

A drive circuit DV receives the timer signal Tm as an input and outputs an electrode negative polarity drive signal Nd when the timer signal Tm=1 or 4 and outputs an electrode positive polarity drive signal Pd when the timer signal Tm=2 or 3. Accordingly, the electrode negative polarity base period and the electrode negative polarity peak period are in electrode negative polarity, and the electrode positive polarity peak period and the electrode positive polarity base period are in electrode positive polarity.

A feed speed setting circuit FR outputs a predetermined feed speed setting signal Fr. A feed control circuit FC receives the feed speed setting signal Fr as an input and outputs a feed control signal Fc for feeding the welding wire 1 at a feed speed Fw corresponding to the value of the feed speed setting signal Fr to the wire feed motor WM.

In FIG. 5, when the electrode positive polarity base period Tb is deleted, the electrode positive polarity base period setting signal Tbr may be set to be 0.

Second Embodiment

A welding current waveform in an AC pulse arc welding control method according to a second embodiment of the present invention is same as that in FIG. 14 except for the waveforms of the electrode negative polarity peak current Ipn in FIGS. 1 to 4 and an electrode positive polarity peak current Ip to be described later. That is, there are a case of taking an electrode negative polarity base period Tbn→an electrode negative polarity peak period Tpn→an electrode positive polarity peak period Tp→an electrode positive polarity base period Tb as one pulse cycle Tf, and a case of taking the electrode negative polarity base period Tbn→the electrode negative polarity peak period Tpn→the electrode positive polarity peak period Tp as one pulse cycle Tf. Hereinafter, the waveform of the electrode positive polarity peak current Ip will be described.

Figure 6:
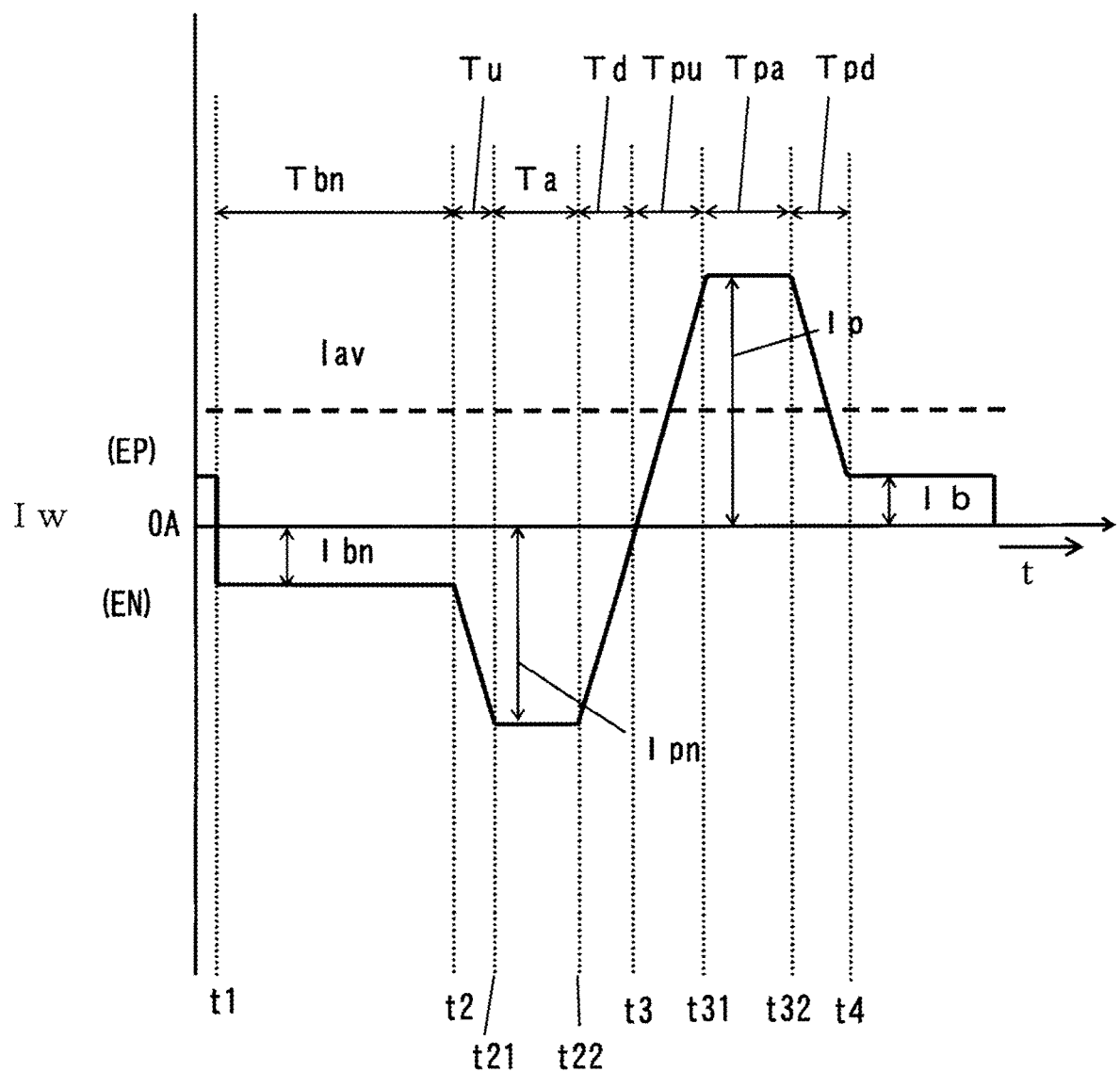
FIG. 6 is a first welding current waveform diagram showing a waveform of an electrode positive polarity peak current Ip in an AC pulse arc welding control method according to a second embodiment of the present invention.

FIG. 6 is a first welding current waveform diagram showing a waveform of the electrode positive polarity peak current Ip in the AC pulse arc welding control method according to the second embodiment of the present invention. Welding current waveforms of other periods are the same as in the first embodiment. In FIG. 6, a period before the time point t3 is the electrode negative polarity peak period Tpn, and a period before the time point t4 is the electrode positive polarity base period Tb. Hereinafter, description will be made with reference to FIG. 6.

In the time point t3, the polarity is inverted, the electrode negative polarity peak period Tpn is switched to the electrode positive polarity peak period Tp, and the electrode positive polarity peak current Ip starts to be applied.

The electrode positive polarity peak period Tp includes an electrode positive polarity rising period Tpu from time points t3 to t31, an electrode positive polarity maximum value period Tpa from time points t31 to t32, and an electrode positive polarity falling period Tpd from time points t32 to t4.

During the electrode positive polarity rising period Tpu from the time points t3 to t31, the current linearly increases from the polarity switching current value to a maximum value. During the electrode positive polarity maximum value period Tpa from the time points t31 to t32, the maximum value is maintained. During the electrode positive polarity falling period Tpd from the time points t32 to t4, the current linearly increases from the maximum value to the electrode positive polarity base current Ib.

The above maximum value is set to a value smaller by about 100 A than the maximum value of the electrode positive polarity peak current Ip in the case of the conventional art shown in FIG. 14. In addition, an integrated value of the electrode positive polarity peak current Ip during the electrode positive polarity peak period Tp is set to substantially the same value as the integrated value in the case of the rectangular wave in the conventional art shown in FIG. 14.

In the second embodiment, a time ratio of electrode positive polarity peak period Tp to the electrode positive polarity maximum value period Tpa is set to be less than 20%. That is, Tpa is set to satisfy (Tpa/Tp)×100<20. Accordingly, the arc pressure acting on the droplets can be alleviated. As a result, since burn-through can be prevented when the base material is a thin sheet, high quality thin sheet welding can be obtained. Particularly, when the material of the base material is stainless steel, the above effect is significant. Therefore, it is desirable to have this waveform when performing stainless steel welding.

When the time ratio of the electrode positive polarity maximum value period Tpa is more than 20%, the arc pressure is strong, and burn-through may occur. It is desirable that the time ratio of the electrode positive polarity maximum value period Tpa is less than 10%. In this way, the arc pressure is further weakened and the probability of occurrence of burn-through is lowered.

Since the integrated value of the electrode positive polarity peak current Ip is substantially the same value as that in the case of the rectangular wave in the conventional art, the size of the formed droplets is equal.

When the material of the base material is stainless steel, numerical examples of the waveform parameter are shown below. Tpu=1.5 ms to 2.0 ms, Tpa=0.2 ms, Tpd=1.5 ms to 2.0 ms, maximum value of Ip=300 A to 400 A.

Figure 7:
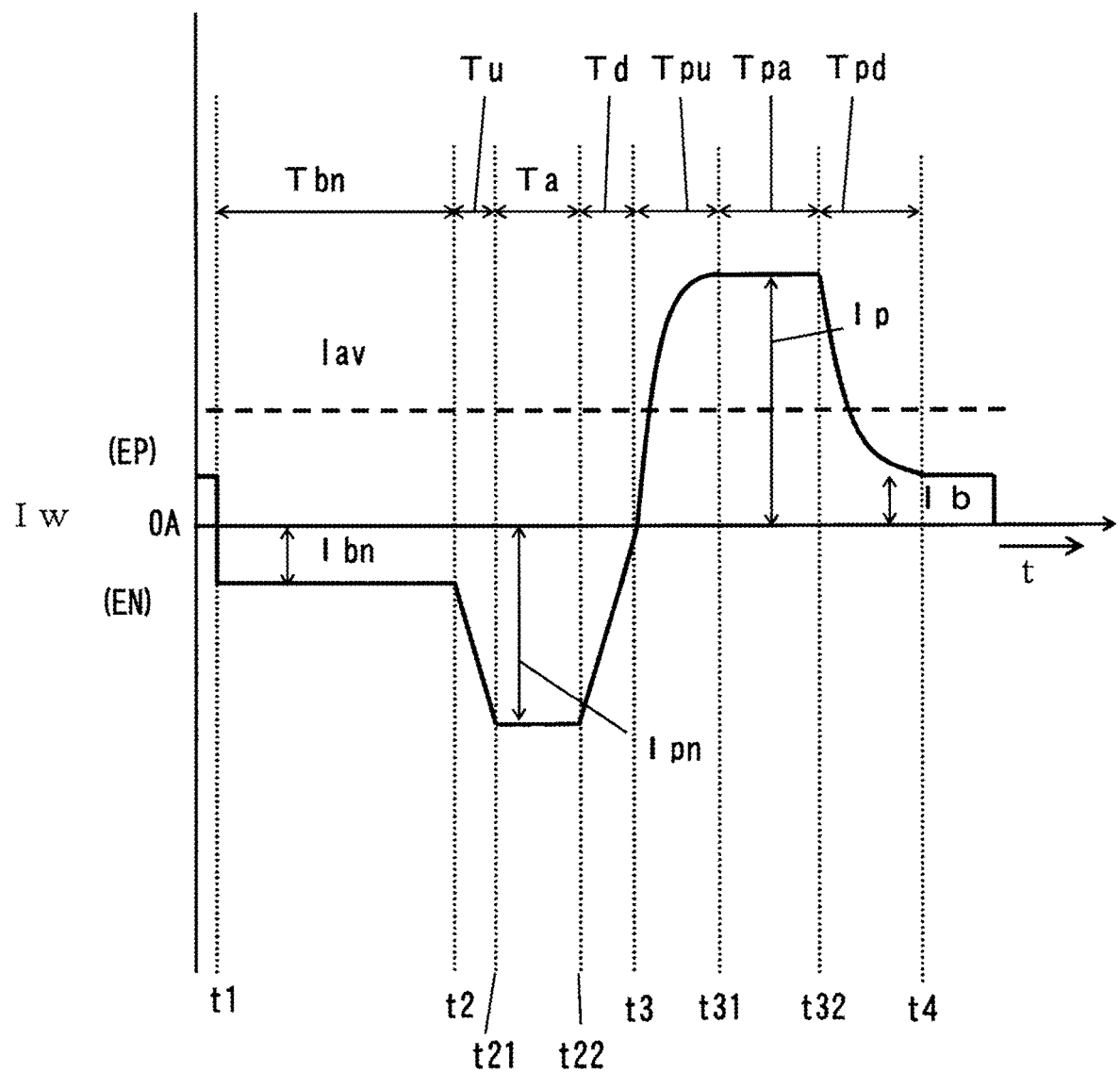
FIG. 7 is a second welding current waveform diagram showing a waveform of an electrode positive polarity peak current Ip in the AC pulse arc welding control method according to the second embodiment of the present invention.

FIG. 7 is a second welding current waveform diagram showing a waveform of the electrode positive polarity peak current Ip in the AC pulse arc welding control method according to the second embodiment of the present invention. FIG. 7 corresponds to FIG. 6 described above, in which the waveforms of the electrode positive polarity rising period Tpu from times t3 to t31 and the electrode positive polarity falling period Tpd from times t32 to t4 are different from those in FIG. 6. The electrode positive polarity maximum value period Tpa from time points t31 to t 32 is the same as that in FIG. 6. Hereinafter, with reference to the FIG. 7, the points different from those in FIG. 6 will be mainly described.

During the electrode positive polarity rising period Tpu from the time points t3 to t31, the welding current increases so that the absolute value of the change ratio of the welding current Iw continuously decreases from the above polarity switching current value to the maximum value. During the electrode positive polarity maximum value period Tpa from the time points t31 to t32, the maximum value is maintained. During the electrode positive polarity falling period Tpd from the time points t32 to t4, the welding current decreases so that the absolute value of the change ratio of the welding current Iw continuously decreases from the maximum value to the electrode positive polarity base current Ib.

The above maximum value is set to a value smaller by about 100 A than the maximum value of the electrode positive polarity peak current Ip in the case of the conventional art shown in FIG. 14. In addition, an integrated value of the electrode positive polarity peak current Ip during the electrode positive polarity peak period Tp is set to be substantially the same value as the integrated value in the case of the rectangular wave in the conventional art shown in FIG. 14.

In the second embodiment, a time ratio of electrode positive polarity peak period Tp to the electrode positive polarity maximum value period Tpa is set to be less than 20%. That is, Tpa is set to satisfy (Tpa/Tp)×100<20. Accordingly, the arc pressure acting on the droplets can be alleviated. As a result, since burn-through can be prevented when the base material is a thin sheet, high quality thin sheet welding can be obtained. Particularly, when the material of the base material is stainless steel, the above effect is significant. Therefore, it is desirable to have this waveform when performing stainless steel welding.

When the time ratio of the electrode positive polarity maximum value period Tpa is more than 20%, the arc pressure is strong, and burn-through may occur. It is desirable that the time ratio of the electrode positive polarity maximum value period Tpa is less than 10%. In this way, the arc pressure is further weakened and the probability of occurrence of burn-through is lowered.

Unlike in FIG. 6, in FIG. 7, the welding current Iw during the electrode positive polarity rising period Tpu changes such that the absolute value of the change ratio decreases as the current value increases. Thus, the change of the arc pressure is further alleviated. Further, the welding current Iw during the electrode positive polarity falling period Tpd has a large absolute value of the change ratio when the current value is large. Thus, the directivity of the arc is strong, and arc instability due to magnetic blowing or the like can be suppressed. Further, the absolute value of the change ratio decreases as the current value decreases. Thus, the arc breakage due to undershoot can be suppressed. As a result, stainless steel can be welded with higher quality.

Figure 8:
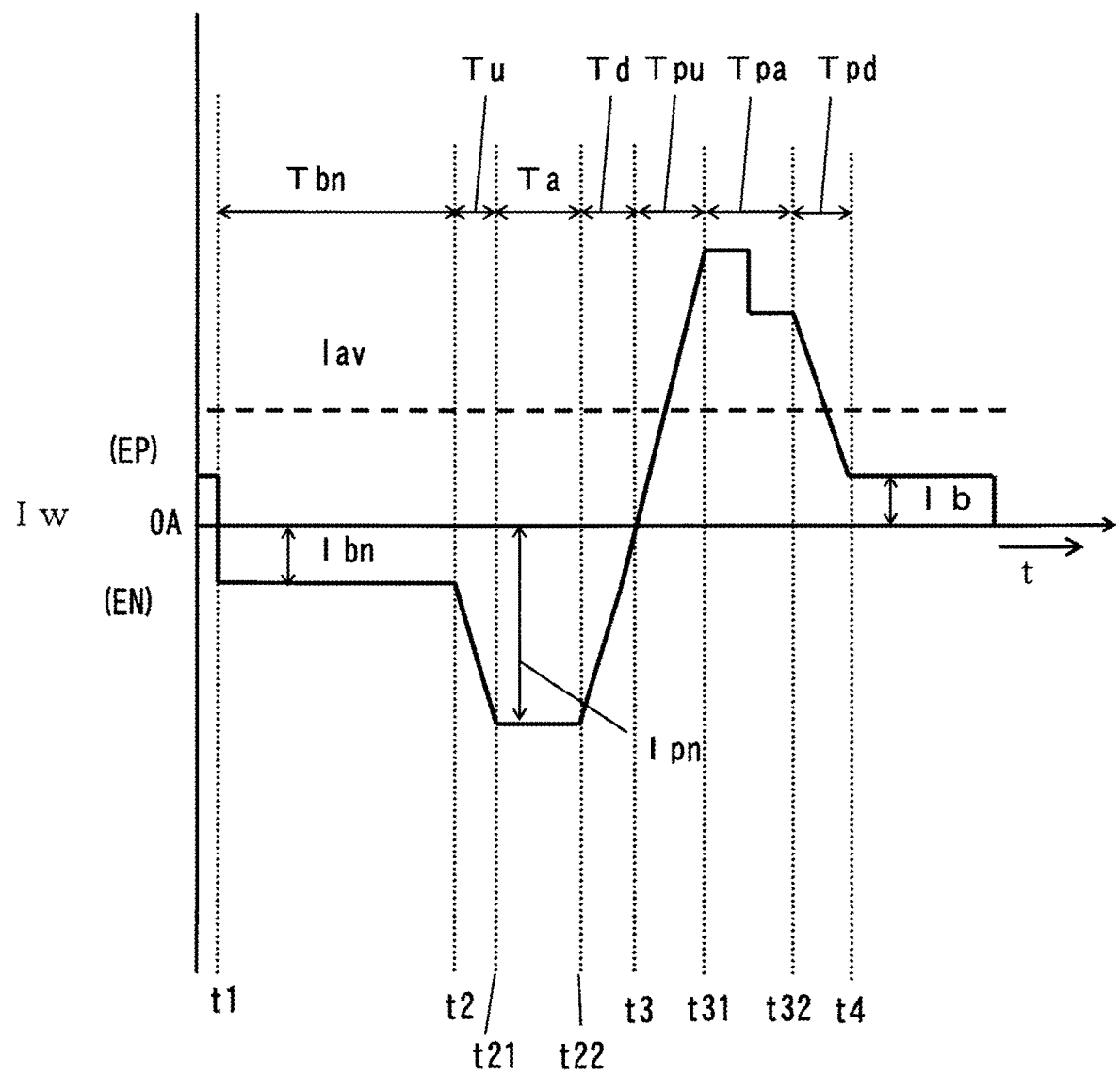
FIG. 8 is a third welding current waveform diagram showing a waveform of an electrode positive polarity peak current Ip in the AC pulse arc welding control method according to the second embodiment of the present invention.

FIG. 8 is a third welding current waveform diagram showing a waveform of the electrode positive polarity peak current Ip in the AC pulse arc welding control method according to the second embodiment of the present invention. Welding current waveforms of other periods are the same as in the first embodiment. In FIG. 6, a period before the time point t3 is the electrode negative polarity peak period Tpn, and a period before the time point t4 is the electrode positive polarity base period Tb. Hereinafter, description will be made with reference to FIG. 8.

In the time point t3, the polarity is inverted, the electrode negative polarity peak period Tpn is switched to the electrode positive polarity peak period Tp, and the electrode positive polarity peak current Ip starts to be applied.

The electrode positive polarity peak period Tp includes an electrode positive polarity rising period Tpu from time points t3 to t31, an electrode positive polarity maximum value period Tpa from time points t31 to t32, and an electrode positive polarity falling period Tpd from time points t32 to t4.

During the electrode positive polarity rising period Tpu from the time points t3 to t31, the current linearly increases from the polarity switching current value to a first maximum value. The electrode positive polarity maximum value period Tpa from the time points t31 to t32 includes a first maximum value period during which a first maximum current is applied and a second maximum value period during which a second maximum current is applied. The first maximum current is larger than the second maximum current. During the electrode positive polarity falling period Tpd from the time points t32 to t4, the current linearly increases from the second maximum value to the electrode positive polarity base current Ib. For example, it is set that Tpu=0.5 ms, Tpa=1.5 ms, and Tpd=0.5 ms.

The difference between the first maximum value and the second maximum value is set to be about 50 A to 100 A. In addition, the average value of the first maximum value and the second maximum value is set to substantially the same value as in the case of the conventional art shown in FIG. 14. In addition, an integrated value of the electrode positive polarity peak current Ip during the electrode positive polarity peak period Tp is set to be substantially the same value as the integrated value in the case of the rectangular wave in the conventional art shown in FIG. 14.

As described above, the droplet transfer state can be stabilized by setting the welding current Iw during the electrode positive polarity maximum value period Tpa to have a stepwise waveform. Particularly, when the material of the base material is steel, the above effect is more significant. Therefore, steel welding can be performed with higher quality.

Figure 9:
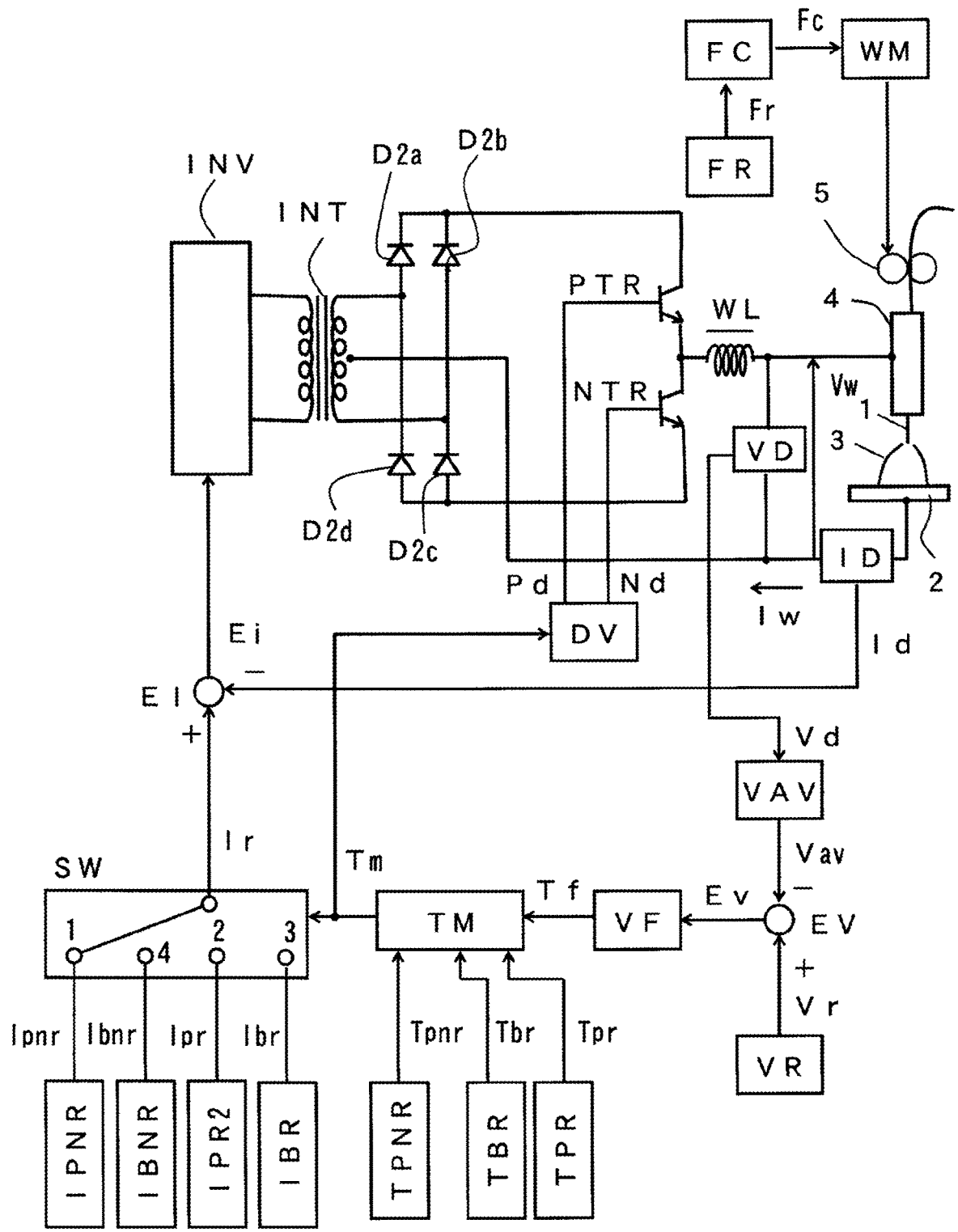
FIG. 9 is a block diagram of a welding power source for performing the AC pulse arc welding control method according to the second embodiment of the present invention.

FIG. 9 is a block diagram of a welding power source for performing the AC pulse arc welding control method according to the second embodiment of the present invention described above with reference to FIGS. 6 to 8. FIG. 9 corresponds to FIG. 5 described above, in which the same reference numerals are attached to the same blocks, and description thereof will not be repeated. In FIG. 9, the electrode positive polarity peak current setting circuit IPR of FIG. 5 is replaced by a second electrode positive polarity peak current setting circuit IPR2. Hereinafter, the block will be described below with reference to FIG. 9.

The second electrode positive polarity peak current setting circuit IPR2 stores the waveforms shown in FIGS. 6 to 8, and outputs the electrode positive polarity peak current setting signal Ipr by selecting one of the waveforms.

Third Embodiment

In an AC pulse arc welding control method according to a third embodiment of the present invention, when a short circuit occurs during the electrode negative polarity base period, a feed speed of the welding wire is reduced until the electrode negative polarity base period ends.

Figure 10:
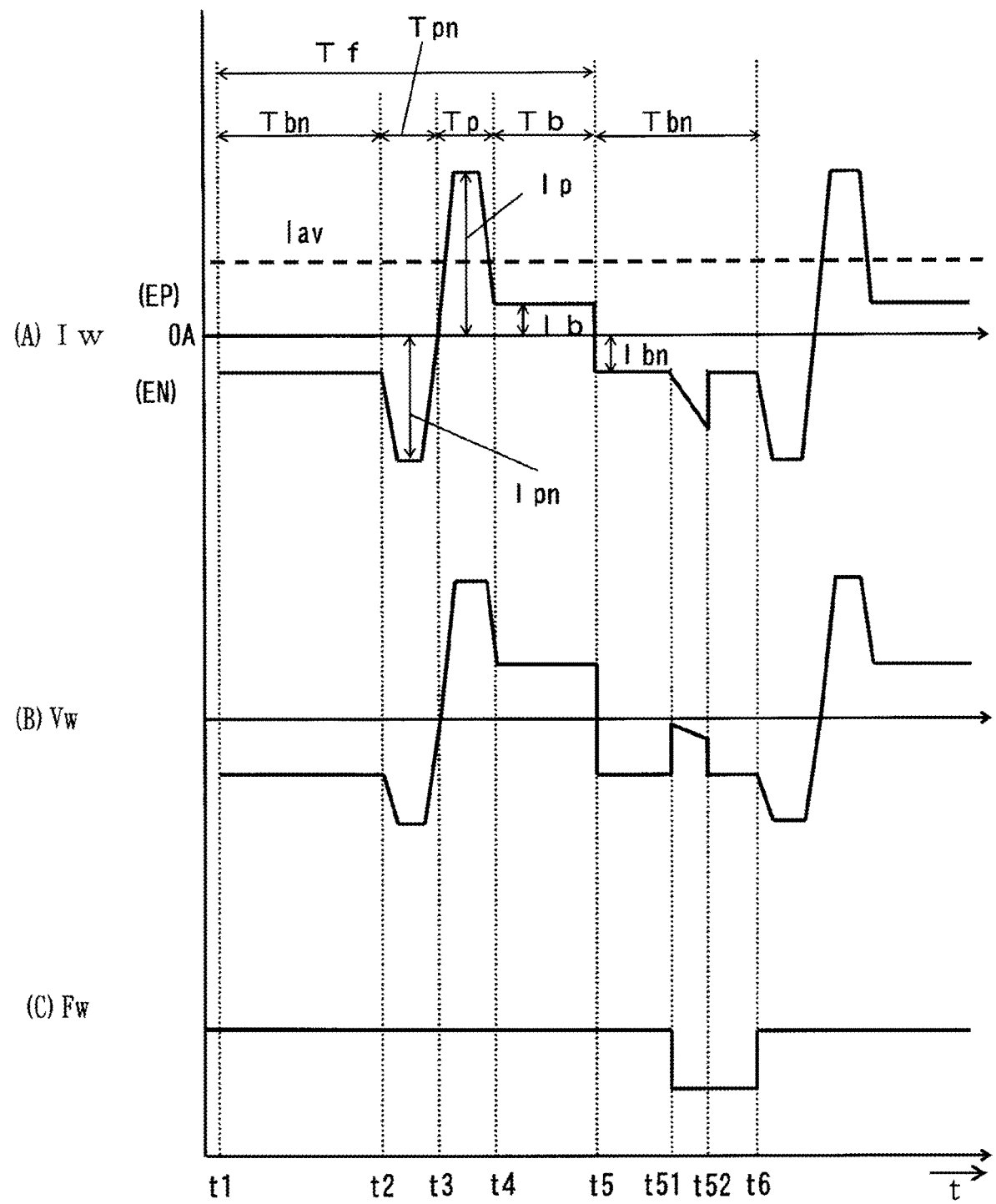
FIG. 10 is a waveform diagram of current, voltage, and feed speed showing an AC pulse arc welding control method according to a third embodiment of the present invention.

FIG. 10 is a waveform diagram of current, voltage, and feed speed showing the AC pulse arc welding control method according to the third embodiment of the present invention. (A) of FIG. 10 shows the change of the welding current Iw with time, (B) of FIG. 10 shows the change of the welding voltage Vw with time, and (C) of FIG. 10 shows the change of the feed speed Fw of the welding wire with time. Hereinafter, description will be made with reference to FIG. 10.

In FIG. 10, a period from time points t1 to t2 is the electrode negative polarity base period Tbn, a period from time points t2 to t3 is the electrode negative polarity peak period Tpn, a period from time points t3 to t4 is the electrode positive polarity peak period Tp, a period from time points t4 to t5 is the electrode positive polarity base period Tb, and a period from time points t5 to t6 is the electrode negative polarity base period Tbn again.

The waveform of the electrode negative polarity peak current Ipn during the electrode negative polarity peak period Tpn from the time points t2 to t3 is the same as one of the above waveforms in FIGS. 1 to 4. (A) of FIG. 10 shows the waveform of FIG. 1. As shown in (B) of FIG. 10, the welding voltage Vw has a waveform similar to the current waveform substantially proportional to the arc length. As shown in (C) of FIG. 10, the feed speed Fw is a steady feed speed having a predetermined constant value.

The waveform of the electrode positive polarity peak current Ip during the electrode positive polarity peak period Tp from the time points t3 to t4 is the same as one of the above waveforms in FIGS. 6 to 8. (A) of FIG. 10 shows the waveform of FIG. 6. As shown in (B) of FIG. 10, the welding voltage Vw has a waveform similar to the current waveform substantially proportional to the arc length. As shown in (C) of FIG. 10, the feed speed Fw is the above steady feed speed.

During the electrode positive polarity base period Tb from the time points t4 to t5, a predetermined electrode positive polarity base current Ib is applied. As shown in (B) of FIG. 10, the welding voltage Vw is an arc voltage value substantially proportional to the arc length. As shown in (C) of FIG. 10, the feed speed Fw is the above steady feed speed.

The operation during the electrode negative polarity base period Tbn from the time points t5 to t6 is as follows. During a period from time points t5 to t51, a predetermined electrode negative polarity base current Ibn is applied. As shown in (B) of FIG. 10, the welding voltage Vw is an arc voltage value substantially proportional to the arc length. As shown in (C) of FIG. 10, the feed speed Fw is the above steady feed speed.

In FIG. 10, a short circuit between the welding wire and the base material occurs at the time point t51. During the short circuit period from time points t51 to t52, the welding current Iw gradually increases as shown in (A) of FIG. 10, the short circuit is released earlier, and the arc is regenerated. As shown in (B) of FIG. 10, the welding voltage Vw has a short-circuit voltage value of several volts. As shown in (C) of FIG. 10, the feed speed Fw is reduced from the occurrence of the short circuit at the time point t51 to a low speed feed speed smaller than the steady feed speed and maintains this value until the electrode negative polarity base period Tbn ends at the time point t6. The feed speed Fw returns to the steady feed speed when entering the electrode negative polarity peak period Tpn. When the arc is regenerated at the time point t52, the welding current Iw returns to the value of the electrode negative polarity base current Ibn as shown in (A) of FIG. 10, and the welding voltage Vw is an arc voltage value as shown in (B) of FIG. 10.

When a short circuit occurs temporarily during the electrode negative polarity base period Tbn, even when the short circuit is released and the arc is regenerated, a short circuit tends to occur again shortly thereafter. That is, once a short circuit occurs during the electrode negative polarity base period Tbn, the occurrence of a short circuit is often repeated for a plurality of times. This is because melting of the welding wire in the electrode negative polarity EN is promoted more than the electrode positive polarity EP, so that the droplets are easily formed even with a small current value. Thus, once a short circuit occurs, even when the arc is regenerated, the arc length is shorter than an appropriate value, and a short circuit occurs due to slight vibration of the droplets and the molten pool. When a short circuit frequently occurs, the formation state of the droplets is unstable, and sputtering also increases as the short circuit occurs.

Therefore, according to the third embodiment, when a short circuit occurs during the electrode negative polarity base period, the feed speed of the welding wire is reduced until the electrode negative polarity base period ends. Accordingly, when a short circuit occurs, the arc length quickly increases after the arc is regenerated since the feed speed is reduced. As a result, recurrence of the short circuit can be prevented. Thus, the formation state of the droplets can be stabilized and occurrence of sputtering can be suppressed.

The third embodiment also includes reducing the feed speed Fw after the short circuit is released and the arc is regenerated.

Figure 11:
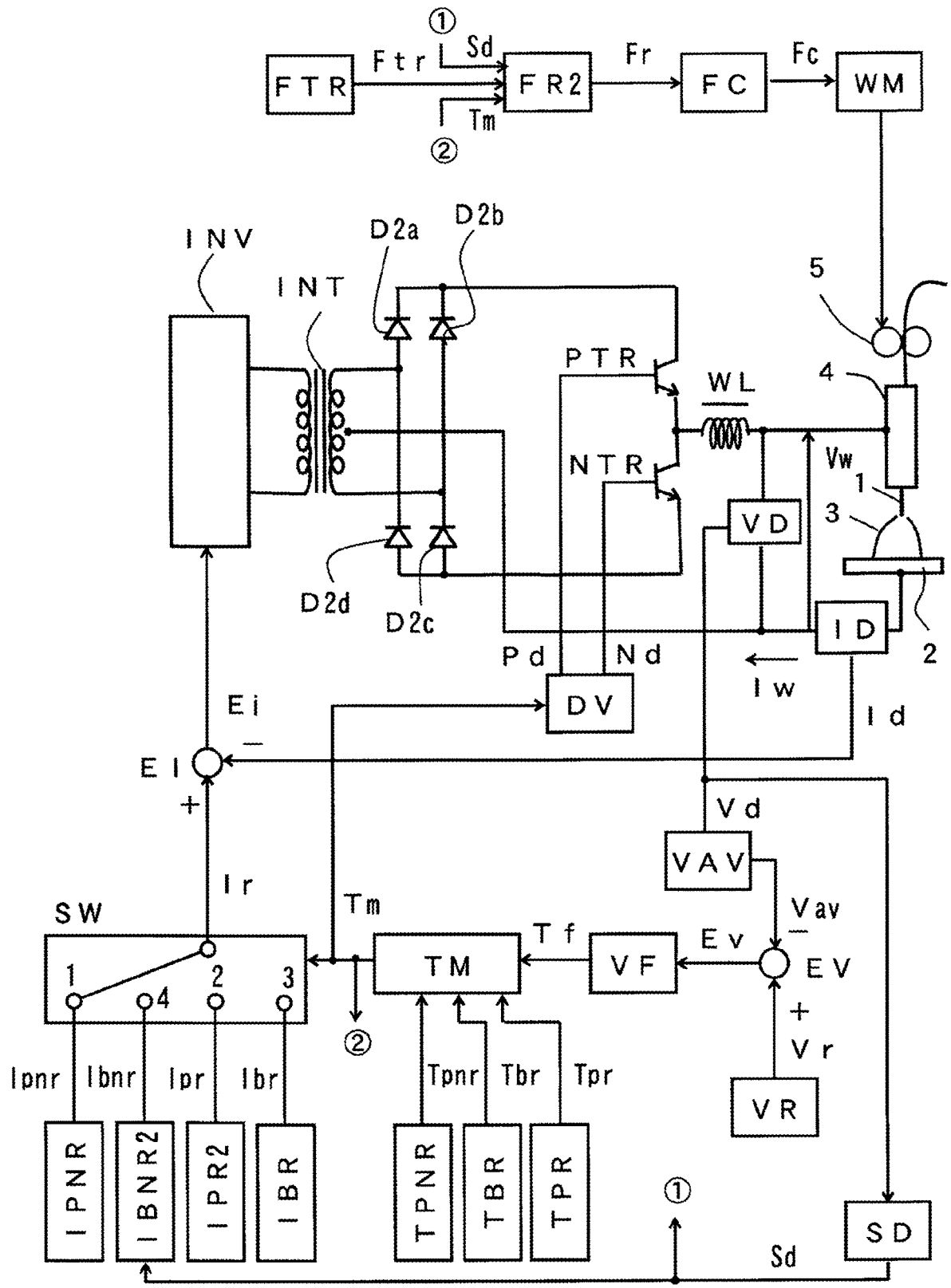
FIG. 11 is a block diagram of a welding power source for performing the AC pulse arc welding control method according to the third embodiment of the present invention.

FIG. 11 is a block diagram of a welding power source for performing an AC pulse arc welding control method according to a third embodiment of the present invention described above with reference to FIG. 10. FIG. 11 corresponds to FIG. 5 and FIG. 9 described above, in which the same reference numerals are attached to the same blocks, and description thereof will not be repeated. In FIG. 11, a short circuit determination circuit SD is added to that of FIG. 9, the electrode negative polarity base current setting circuit IBNR in FIG. 9 is replaced by a second electrode negative polarity base current setting circuit IBNR2, a low-speed feed speed setting circuit FTR is added to that of FIG. 9, and the feed speed setting circuit FR of FIG. 9 is replaced by a second feed speed setting circuit FR2. Hereinafter, the blocks will be described below with reference to FIG. 11.

The short circuit determination circuit SD receives the voltage detection signal Vd as an input, determines a short circuit or an arc based on the value of the voltage detection signal Vd and outputs a short circuit determination signal Sd which is at a high level during the short circuit period and is at a low level during the an arc period.

The second electrode negative polarity base current setting circuit IBNR2 receives the short circuit determination signal Sd as an input, and outputs the electrode negative polarity base current setting signal Ibnr, which has a predetermined electrode negative polarity base current value when the short circuit determination signal Sd is at a low level (arc period), and has a value increasing along with the time from the electrode negative polarity base current value when the short circuit determination signal Sd is at a high level (short circuit period).

The low-speed feed speed setting circuit FTR outputs a predetermined low-speed feed speed setting signal Ftr. The value of the low-speed feed speed setting signal Ftr is set to be about 70% to 90% of the steady feed speed.

The second feed speed setting circuit FR2 receives the short circuit determination signal Sd, the timer signal Tm and the low-speed feed speed setting signal Ftr as inputs, and outputs a feed speed setting signal Fr which has the value of the low-speed feed speed setting signal Ftr during a period from a time point when the short circuit discrimination signal Sd changes to the high level (short circuit) during the timer signal Tm=4 (electrode negative polarity base period Tbn) until the timer signal Tm changes to 1 (electrode negative polarity peak period Tpn), and has a predetermined steady feed speed during other periods.

Fourth Embodiment

In an AC pulse arc welding control method according to a fourth embodiment of the present invention, when a short circuit occurs during the electrode negative polarity base period, the electrode negative polarity base period is shifted to the electrode negative polarity peak period.

Figure 12:
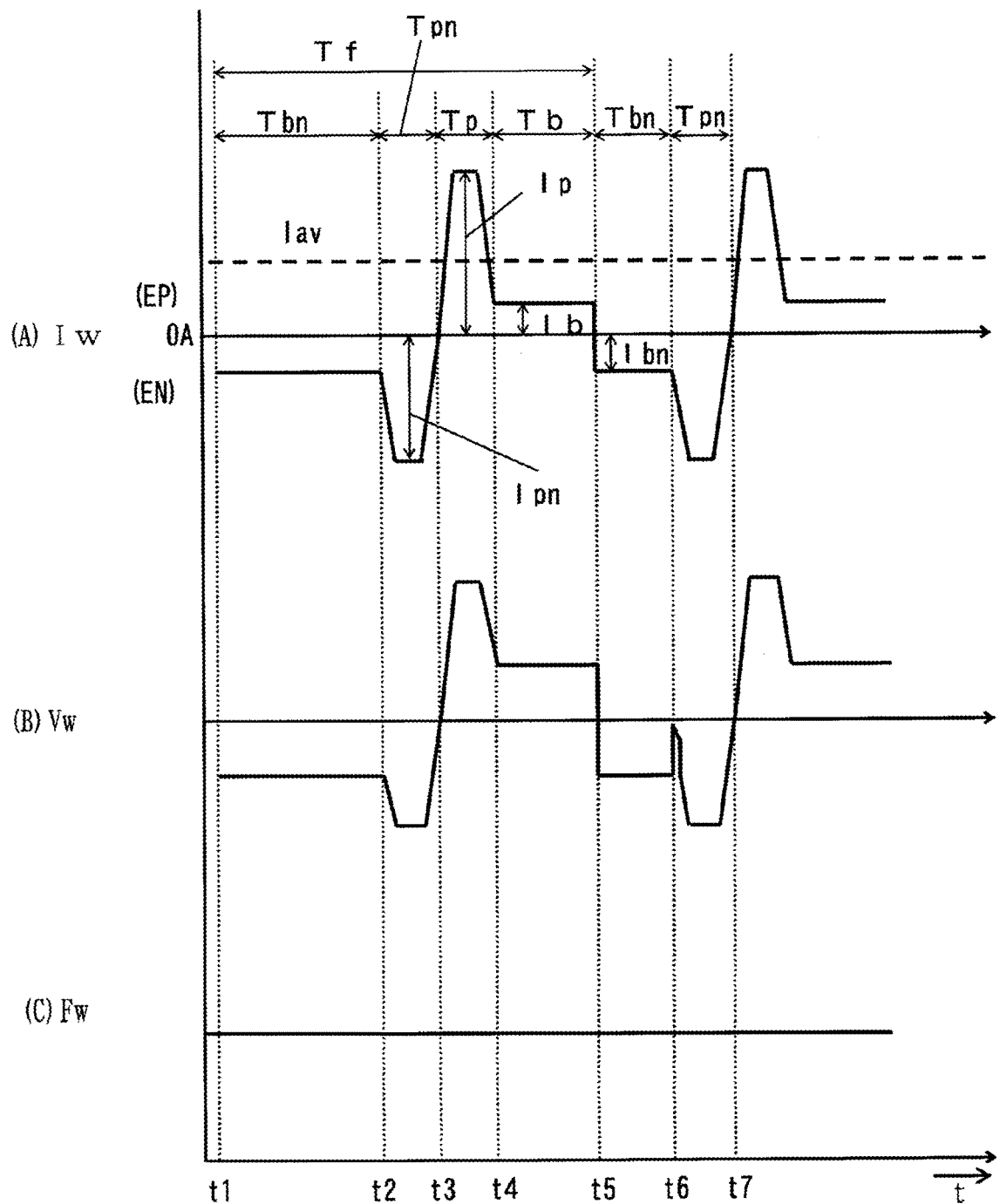
FIG. 12 is a waveform diagram of current, voltage, and feed speed showing an AC pulse arc welding control method according to a fourth embodiment of the present invention.

FIG. 12 is a waveform diagram of current, voltage, and feed speed showing the AC pulse arc welding control method according to the fourth embodiment of the present invention. (A) of FIG. 12 shows the change of the welding current Iw with time, (B) of FIG. 12 shows the change of the welding voltage Vw with time, and (C) of FIG. 12 shows the change of the feed speed Fw of the welding wire with time. FIG. 12 corresponds to FIG. 10 described above, and description of the same operation will not be repeated. Hereinafter, description will be made with reference to FIG. 12.

In FIG. 12, a period from time points t1 to t2 is the electrode negative polarity base period Tbn, a period from time points t2 to t3 is the electrode negative polarity peak period Tpn, a period from time points t3 to t4 is the electrode positive polarity peak period Tp, a period from time points t4 to t5 is the electrode positive polarity base period Tb, a period from time points t5 to t6 is the electrode negative polarity base period Tbn again, and a period from time points t6 to t7 is the electrode negative polarity peak period Tpn again. The operations of the electrode negative polarity peak period Tpn, the electrode positive polarity peak period Tp and the electrode positive polarity base period Tb are the same as those in FIG. 10, and description thereof will not be repeated.

The operation during the electrode negative polarity base period Tbn from the time points t5 to t6 is as follows. During a period from the time point t5 until a short circuit occurs, a predetermined electrode negative polarity base current Ibn is applied. As shown in (B) of FIG. 12, the welding voltage Vw is an arc voltage value substantially proportional to the arc length. As shown in (C) of FIG. 12, the feed speed Fw is a steady feed speed having a predetermined constant value.

At a time when the timer signal Tm changes from 4 to 1, the electrode negative polarity base period Tbn shifts to the electrode negative polarity peak period Tpn. When a short circuit occurs at the time t6 when the timer signal Tm=4, the timer signal Tm is forced to be 1. In this way, at the time when the short circuit occurs, the electrode negative polarity base period Tbn is interrupted and is shifted to the electrode negative polarity peak period Tpn.

According to the fourth embodiment, when a short circuit occurs during the electrode negative polarity base period, the electrode negative polarity base period is shifted to the electrode negative polarity peak period. Accordingly, when a short circuit occurs, short circuit is released earlier and the arc length quickly increases after the arc is regenerated since the welding current is increased by shifting to the electrode negative polarity peak period. As a result, recurrence of the short circuit can be prevented. Thus, the formation state of the droplets can be stabilized and occurrence of sputtering can be suppressed.

The fourth embodiment also includes shifting the electrode negative polarity base period Tbn to the electrode negative polarity peak period Tpn after the short circuit is released and the arc is regenerated.

Figure 13:
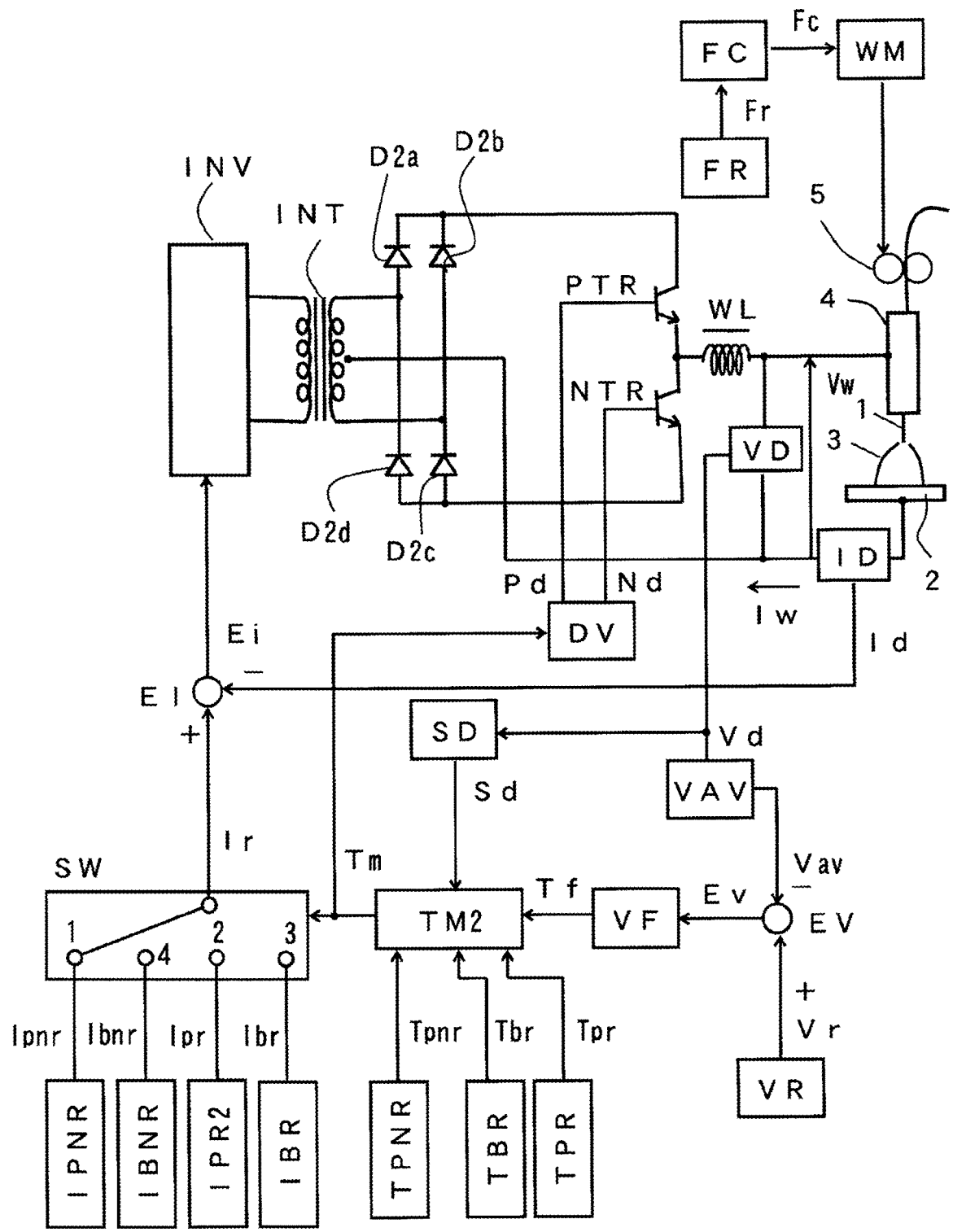
FIG. 13 is a block diagram of a welding power source for performing the AC pulse arc welding control method according to the fourth embodiment of the present invention.

FIG. 13 is a block diagram of a welding power source for performing the AC pulse arc welding control method according to the third embodiment of the present invention described above with reference to FIG. 12. FIG. 13 corresponds to FIG. 5 and FIG. 9 described above, in which the same reference numerals are attached to the same blocks, and description thereof will not be repeated. In FIG. 13, a short circuit determination circuit SD is added to that of FIG. 9, and the timer circuit TM in FIG. 9 is replaced by a second timer circuit TM2. Hereinafter, the blocks will be described below with reference to FIG. 11.

The short circuit determination circuit SD receives the voltage detection signal Vd as an input, determines a short circuit or an arc based on the value of the voltage detection signal Vd and outputs a short circuit determination signal Sd which is at a high level during the short circuit period and is at a low level during the an arc period.

The second timer circuit TM2 receives the short circuit determination signal Sd, the pulse cycle signal Tf, the electrode negative polarity peak period setting signal Tpnr, the electrode positive polarity peak period setting signal Tpr and the electrode positive polarity base period setting signal Tbr as inputs and then outputs the timer signal Tm. When the pulse cycle signal Tf changes to the high level for a short time, or when the timer signal Tm=4 and the short circuit determination signal Sd changes to the high level, the value of the timer signal becomes 1 during a period determined by the electrode negative polarity peak period setting signal Tpnr. Then, the value of the timer signal becomes 2 during a period determined by the electrode positive polarity peak period setting signal Tpr. Then, the value of the timer signal becomes 3 during a period determined by the electrode positive polarity base period setting signal Tbr. Thereafter, the value of the timer signal becomes 4 during the electrode negative polarity base period.

INDUSTRIAL APPLICABILITY

According to the present invention, a growth state of a droplet during an electrode negative polarity peak period can be stabilized in consumable electrode AC pulse arc welding.

Although the present invention has been described with reference to specific embodiments, the present invention is not limited to this embodiment, and various modifications are possible without departing from the technical concept of the disclosed invention.

This application is based on Japanese patent application filed on Oct. 24, 2016 (Japanese Patent Application No. 2016-207958), Japanese patent application filed on Nov. 30, 2016 (Japanese Patent Application No. 2016-232014), and Japanese patent application filed on Dec. 28, 2016 (Japanese Patent Application No. 2016-254894), contents of which are hereby incorporated by reference.

DESCRIPTION OF REFERENCE NUMERALS

1. Welding wire
2. Base material
3. Arc
4. Welding torch
5. Feed roll
DV Drive circuit
EI Current error amplification circuit Ei Current error amplification signal
EN Electrode negative polarity
EP Electrode positive polarity
EV Voltage error amplification circuit
Ev Voltage error amplification signal
FC Feed control circuit
Fc Feed control signal
FR Feed speed setting circuit
Fr Feed speed setting signal
FR2 Second feed speed setting circuit
FTR Low-speed feed speed setting circuit
Ftr Low-speed feed speed setting signal
Fw Feed speed
Ib Electrode positive polarity base current
Ibn Electrode negative polarity base current
IBNR Electrode negative polarity base current setting circuit
Ibnr Electrode negative polarity base current setting signal
IBNR2 Second electrode negative polarity base current setting circuit
IBR Electrode positive polarity base current setting circuit
Ibr Electrode positive polarity base current setting signal
ID Current detection circuit
Id Current detection signal
Ien Electrode negative polarity current
Iep Electrode positive polarity current
INT Inverter transformer
INV Inverter circuit
Ip Electrode positive polarity peak current
Ipn Electrode negative polarity peak current
IPNR Electrode negative polarity peak current setting circuit
Ipnr Electrode negative polarity peak current setting signal
IPR Electrode positive polarity peak current setting circuit
Ipr Electrode positive polarity peak current setting signal
IPR2 Second electrode positive polarity peak current setting circuit
Ir Current setting signal
Iw Welding current
Nd Electrode negative polarity drive signal
NTR Electrode negative polarity transistor
Pd Electrode positive polarity drive signal
PTR Electrode positive polarity transistor
Ren Electrode negative polarity current ratio
SD Short circuit determination circuit
Sd Short circuit determination signal
SW Switching circuit
Ta Peak period
Tb Electrode positive polarity base period
Tbn Electrode negative polarity base period
TBR Electrode positive polarity base period setting circuit
Tbr Electrode positive polarity base period setting signal
Td Falling period
Ten Electrode negative polarity period
Tep Electrode positive polarity period
Tf Pulse cycle (signal)
TM Timer circuit
Tm Timer signal
TM2 Second timer circuit
Tp Electrode positive polarity peak period
Tpa Electrode positive polarity maximum value period
Tpd Electrode positive polarity falling period
Tpn Electrode negative polarity peak period
TPNR Electrode negative polarity peak period setting circuit
Tpnr Electrode negative polarity peak period setting signal
TPR Electrode positive polarity peak period setting circuit
Tpr Electrode positive polarity peak period setting signal
Tpu Electrode positive polarity rising period
Tu Rising period
VAV Voltage averaging circuit
Vav Voltage average value signal
VD Voltage detection circuit
Vd Voltage detection signal
VF Voltage and frequency conversion circuit
VR Voltage setting circuit
Vr Voltage setting signal
Vw Welding voltage
WL Reactor
WM Wire feed motor

The invention claimed is:

1. An AC pulse arc welding control method for controlling welding comprising:
feeding a welding wire, and
applying repeatedly welding currents in accordance with a welding current waveform, one cycle of which includes an electrode negative polarity base current during an electrode negative polarity base period, an electrode negative polarity peak period current during an electrode negative polarity peak period, and an electrode positive polarity current during an electrode positive polarity period, to repeatedly apply these welding currents to repeatedly attain a transfer of droplets, wherein
the electrode negative polarity base current, the electrode negative polarity peak period current and the electrode positive polarity current are applied continuously in this order,
the electrode negative polarity peak period (Tpn) comprises a rising period (Tu), a peak period (Ta) and a falling period (Td), wherein Tpn=Tu+Ta+Td, and
a time ratio (Ta/Tpn) of the peak period (Ta) to the electrode negative polarity peak period (Tpn) is set so that (Ta/Tpn)×100 is greater than zero and less than 20%, and
wherein the transfer of droplets occurs once per each cycle of the welding current waveform.

2. The AC pulse arc welding control method according to claim 1, wherein
the falling period is a period twice or more longer than the rising period.

3. The AC pulse arc welding control method according to claim 2, wherein
the welding current continuously decreases during the falling period.

4. The AC pulse arc welding control method according to claim 2, wherein
an absolute value of the welding current during the falling period is a constant value smaller than that during the peak period.

5. The AC pulse arc welding control method according to claim 2, wherein
the welding current decreases so that an absolute value of a change ratio of the welding current continuously increases during the falling period.

6. The AC pulse arc welding control method according to claim 2, wherein
the electrode positive polarity period comprises an electrode positive polarity peak period during which an electrode positive polarity peak current is applied,
the electrode positive polarity peak period comprises an electrode positive polarity rising period, an electrode positive polarity maximum value period, and an electrode positive polarity falling period, and
a time ratio of the electrode positive polarity maximum value period to the electrode positive polarity peak period is less than 20%.

7. The AC pulse arc welding control method according to claim 6, wherein
the welding current increases so that an absolute value of a change ratio of the welding current continuously decreases during the electrode positive polarity rising period, and
the welding current decreases so that an absolute value of a change ratio of the welding current continuously decreases during the electrode positive polarity falling period.

8. The AC pulse arc welding control method according to claim 2, wherein
the electrode positive polarity period comprises an electrode positive polarity peak period during which an electrode positive polarity peak current is applied,
the electrode positive polarity peak period comprises an electrode positive polarity rising period, an electrode positive polarity maximum value period, and an electrode positive polarity falling period, and
the electrode positive polarity maximum value period comprises a first maximum value period during which a first maximum current is applied and a second maximum value period during which a second maximum current is applied, and the first maximum current is larger than the second maximum current.

9. The AC pulse arc welding control method according to claim 2, wherein
when a short circuit occurs during the electrode negative polarity base period, a feed speed of the welding wire is reduced until the electrode negative polarity base period ends.

10. The AC pulse arc welding control method according to claim 2, wherein
when a short circuit occurs during the electrode negative polarity base period, the electrode negative polarity base period is shifted to the electrode negative polarity peak period.

11. The AC pulse arc welding control method according to claim 1, wherein
the welding current continuously decreases during the falling period.

12. The AC pulse arc welding control method according to claim 1, wherein
an absolute value of the welding current during the falling period is a constant value smaller than that during the peak period.

13. The AC pulse arc welding control method according to claim 1, wherein
the welding current decreases so that an absolute value of a change ratio of the welding current continuously increases during the falling period.

14. The AC pulse arc welding control method according to claim 1, wherein
the electrode positive polarity period comprises an electrode positive polarity peak period during which an electrode positive polarity peak current is applied,
the electrode positive polarity peak period comprises an electrode positive polarity rising period, an electrode positive polarity maximum value period, and an electrode positive polarity falling period, and
a time ratio of the electrode positive polarity maximum value period to the electrode positive polarity peak period is less than 20%.

15. The AC pulse arc welding control method according to claim 14, wherein
the welding current increases so that an absolute value of a change ratio of the welding current continuously decreases during the electrode positive polarity rising period, and
the welding current decreases so that an absolute value of a change ratio of the welding current continuously decreases during the electrode positive polarity falling period.

16. The AC pulse arc welding control method according to claim 1, wherein
the electrode positive polarity period comprises an electrode positive polarity peak period during which an electrode positive polarity peak current is applied,
the electrode positive polarity peak period comprises an electrode positive polarity rising period, an electrode positive polarity maximum value period, and an electrode positive polarity falling period, and
the electrode positive polarity maximum value period comprises a first maximum value period during which a first maximum current is applied and a second maximum value period during which a second maximum current is applied, and the first maximum current is larger than the second maximum current.

17. The AC pulse arc welding control method according to claim 1, wherein
when a short circuit occurs during the electrode negative polarity base period, a feed speed of the welding wire is reduced until the electrode negative polarity base period ends.

18. The AC pulse arc welding control method according to claim 1, wherein
when a short circuit occurs during the electrode negative polarity base period, the electrode negative polarity base period is shifted to the electrode negative polarity peak period.

* * * * *